(12) United States Patent
Milam et al.

(10) Patent No.: US 12,271,873 B2
(45) Date of Patent: *Apr. 8, 2025

(54) SYSTEMS AND METHODS FOR IMPROVING ERROR TOLERANCE IN PROCESSING AN INPUT FILE

(71) Applicant: MASTERCARD INTERNATIONAL INCORPORATED, Purchase, NY (US)

(72) Inventors: Amy C. Milam, Wentzville, MO (US); Anita C. Galliani, Lake Saint Louis, MO (US); Stephan J. Klaus, St. Louis, MO (US); Walter Lo Faro, Chesterfield, MO (US); Lorrie M. Littlefield, Chesterfield, MO (US); Pauline Ow, Chesterfield, MO (US); Gautam Uppalapati, O'Fallon, MO (US); Thakur B. Kondasani, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,283

(22) Filed: Jun. 30, 2023

(65) Prior Publication Data

US 2023/0351349 A1 Nov. 2, 2023

Related U.S. Application Data

(63) Continuation of application No. 16/284,859, filed on Feb. 25, 2019, now Pat. No. 11,694,172, which is a
(Continued)

(51) Int. Cl.
*G06Q 20/10* (2012.01)
*G06Q 30/04* (2012.01)

(52) U.S. Cl.
CPC ........... *G06Q 20/102* (2013.01); *G06Q 30/04* (2013.01)

(58) Field of Classification Search
CPC ............................. G06Q 20/102; G06Q 30/04
(Continued)

(56) References Cited

U.S. PATENT DOCUMENTS 5,699,528 A 12/1997 Hogan
6,006,221 A 12/1999 Liddy et al.
(Continued)

FOREIGN PATENT DOCUMENTS

JP 06195386 A 7/1994
JP 0927004 A 1/1997
(Continued)

OTHER PUBLICATIONS

Sofoluwe, A.B., A Conceptual Design of Electronic Bill Presentment and Payment System. (Year: 2006).*
(Continued)

*Primary Examiner* — Bruce I Ebersman
*Assistant Examiner* — John O Preston
(74) *Attorney, Agent, or Firm* — Armstrong Teasdale LLP

(57) ABSTRACT

A computer system including a processor, in communication with a database, programmed to identify a plurality of billers from the database, including biller information, and receive a payee file including payee information identifying a payee which issued a bill to a payor. The processor determines an approximate match score for each of the billers in a first set of billers of the plurality of billers by comparing payee information to biller information and identifies a candidate list of billers from the first set of billers having an approximate match score indicating a likelihood of matching the payee information. The processor adjusts the candidate list of billers by altering the match score of at least one candi-
(Continued)

date biller by comparing a payee account number of the payee information to an account mask associated with the candidate biller and generates an output file of candidate biller information from the adjusted candidate list.

20 Claims, 8 Drawing Sheets

Related U.S. Application Data continuation of application No. 13/949,066, filed on Jul. 23, 2013, now abandoned, which is a continuation-in-part of application No. 13/457,222, filed on Apr. 26, 2012, now abandoned.

(58) Field of Classification Search
USPC .................................................... 705/4, 40
See application file for complete search history.

(56) References Cited

U.S. PATENT DOCUMENTS

| | | | |
|---|---|---|---|
| 6,073,095 | A | 6/2000 | Dharanipragada et al. |
| 6,167,369 | A | 12/2000 | Schulze |
| 7,206,303 | B2 | 4/2007 | Karas et al. |
| 7,216,073 | B2 | 5/2007 | Lavi et al. |
| 7,266,554 | B2 | 9/2007 | Kayahara et al. |
| 7,290,048 | B1 | 10/2007 | Barnett et al. |
| 7,296,011 | B2 | 11/2007 | Chaudhuri et al. |
| 7,328,211 | B2 | 2/2008 | Bordner et al. |
| 7,526,448 | B2 | 4/2009 | Zielke et al. |
| 7,660,766 | B1 | 2/2010 | Lawson et al. |
| 7,698,228 | B2 | 4/2010 | Gailey et al. |
| 7,792,325 | B2 | 9/2010 | Rhoads et al. |
| 7,925,652 | B2 | 4/2011 | Merz et al. |
| 7,930,248 | B1 | 4/2011 | Lawson et al. |
| 8,005,754 | B2 | 8/2011 | McCoy et al. |
| 8,010,424 | B1 | 8/2011 | Hamilton et al. |
| 8,036,226 | B1* | 10/2011 | Ma .......................... H04L 45/24 |
| | | | 370/252 |
| 8,073,773 | B2 | 12/2011 | Kozee et al. |
| 8,140,462 | B2 | 3/2012 | Lambov |
| 8,219,550 | B2 | 7/2012 | Merz et al. |
| 8,266,168 | B2* | 9/2012 | Bayliss ................ G06F 16/215 |
| | | | 707/758 |
| 2002/0013768 | A1 | 1/2002 | Ganesan |
| 2002/0099536 | A1 | 7/2002 | Bordner et al. |
| 2002/0124015 | A1 | 9/2002 | Cardno et al. |
| 2002/0161647 | A1 | 10/2002 | Gailey et al. |
| 2004/0088237 | A1 | 5/2004 | Moenickheim et al. |
| 2004/0088251 | A1 | 5/2004 | Moenickheim et al. |
| 2004/0088255 | A1 | 5/2004 | Zielke et al. |
| 2004/0133509 | A1 | 7/2004 | McCoy et al. |
| 2004/0139010 | A1* | 7/2004 | McMichael .......... G06Q 20/102 |
| | | | 705/40 |
| 2004/0143546 | A1 | 7/2004 | Wood et al. |
| 2004/0167888 | A1 | 8/2004 | Kayahara et al. |
| 2004/0210520 | A1 | 10/2004 | Fitzgerald et al. |
| 2004/0260694 | A1 | 12/2004 | Chaudhuri et al. |
| 2005/0222952 | A1 | 10/2005 | Garrett et al. |
| 2005/0278292 | A1 | 12/2005 | Ohi et al. |
| 2006/0229961 | A1* | 10/2006 | Lyftogt ................ G06Q 20/108 |
| | | | 707/999.1 |
| 2006/0277130 | A1 | 12/2006 | Harmon |
| 2007/0073745 | A1 | 3/2007 | Scott et al. |
| 2007/0162481 | A1 | 7/2007 | Millett |
| 2007/0192872 | A1 | 8/2007 | Rhoads et al. |
| 2007/0276841 | A1 | 11/2007 | Rhoads et al. |
| 2007/0276928 | A1 | 11/2007 | Rhoads et al. |
| 2008/0149960 | A1 | 6/2008 | Amo et al. |
| 2008/0157113 | A1 | 7/2008 | Hayashi |
| 2008/0218072 | A1 | 9/2008 | Haruna et al. |
| 2009/0171955 | A1 | 7/2009 | Merz et al. |
| 2009/0271424 | A1 | 10/2009 | Bayliss |
| 2010/0145840 | A1 | 6/2010 | Kasower |
| 2010/0306091 | A1 | 12/2010 | Homer et al. |
| 2011/0145116 | A1 | 6/2011 | Lawson et al. |
| 2012/0095990 | A1 | 4/2012 | Lambov |
| 2013/0066775 | A1 | 3/2013 | Milam |

FOREIGN PATENT DOCUMENTS

| | | | |
|---|---|---|---|
| JP | 2002014999 | A | 1/2002 |
| JP | 2005352888 | A | 12/2005 |
| JP | 2006004366 | A | 1/2006 |
| JP | 2007122398 | A | 5/2007 |

OTHER PUBLICATIONS

Thangamuthu, A.P., 2020. A survey on various online payment and billing techniques. Humanities, 7(3), pp. 86-91. (Year: 2020).*

Jayasena, S., Bressan, S. and Madnick, S., 2005. A case study of Electronic Bill Presentment and Payment (EBPP) integration using the COIN mediation technology. (Year: 2005).*

PCT International Search Report and Written Opinion, Application No. PCT/US2014/043832, dated Oct. 16, 2014, 11 pps.

PCT International Search Report and Written Opinion, Application No. PCT/US2013/037606, dated Jul. 26, 2013, 11 pps.

O. Owolabi et al., "Fast Approximate String Matching", Software Practice and Experience, Wiley and Sons, Bognar Regis, GB, vol. 18, No. 4, Apr. 1, 1988, pp. 387-393.

Gisli R. Hjaltason et al., "Properties of Embedding Methods for Similarity Searching in Metric Spaces", IEEE Transactions on Pattern Analysis and Machine Intelligence, vol. 25, No. 5, May 1, 2003, pp. 530-549.

Reinier H. van Leuken et al., "Selecting vantage objects for similarity indexing", 18th International Conference on Pattern Recognition, vol. 3, Jan. 1, 2006, pp. 453-456.

Rainer Schnell et al., "A Novel Error-Tolerant Anonymous Linking Code", available at https://ssrn.com/abstract=3549247, 2011, 14 pages.

Michael Weiner et al., "A practical method of linking data from Medicare claims and a comprehensive electronic medical records system", International Journal of Medical Informatics, 71(1), 2003, pp. 57-69.

Mngfeng Wang et al., "MIDAS: A Database-Searching Algorithm for Metabolite Identification in Metabolomics", Analytical Chemistry, 86(19), 2014, pp. 9496-9503.

* cited by examiner

SYSTEMS AND METHODS FOR IMPROVING ERROR TOLERANCE IN PROCESSING AN INPUT FILE

CROSS REFERENCE TO RELATED APPLICATIONS

This application is a continuation of U.S. patent application Ser. No. 16/284,859, filed Feb. 25, 2019, entitled "SYSTEMS AND METHODS FOR IMPROVING ERROR TOLERANCE IN PROCESSING AN INPUT FILE", which is a continuation of U.S. patent application Ser. No. 13/949,066, filed Jul. 23, 2013, entitled "SYSTEMS AND METHODS FOR VERIFYING PAYEE INFORMATION IN ELECTRONIC PAYMENTS", which is a continuation-in-part application of U.S. patent application Ser. No. 13/457,222, filed Apr. 26, 2012, entitled "SYSTEMS AND METHODS FOR FACILITATING PROCESSING OF ELECTRONIC PAYMENTS", the disclosures of all of which are hereby incorporated herein by reference in their entirety.

BACKGROUND OF THE DISCLOSURE

The field of the disclosure relates generally to systems and methods for electronic bill payment, and more particularly to network-based systems and methods for facilitating processing of electronic payments by approximate matching payee information, entered on behalf of a payor for a bill being paid by the payor, to biller data stored within a biller database, wherein in the case of an approximate match a biller stored within the biller database is associated with the payee information.

Known electronic bill presentment and payment systems enable payors to receive and pay bills electronically. Initially, a payor must identify a potential biller/payee to the system. Typically, in known systems, the payor identifies a potential payee by name and by a payee zip code. For example, the payor may have a paper bill that the payor desires to pay electronically. Using the payee name and remittance address on the paper bill, the payor identifies the payee to the system. Known systems compare the payee name and zip code to payees that are known to the system (i.e., known "billers"). More particularly, known systems may maintain a database of billers that includes information on how to transfer payments to the payee electronically, e.g., using electronic funds transfer (EFT). In addition, some known bill payment systems use a payment network, such as the MasterCard® Network, to transfer payments from payors to payees (MasterCard is a registered trademark of MasterCard International, of Purchase, New York).

After the payee is matched to a known biller, the payor may receive bills and submit payments electronically through the system. If the payee cannot be matched to a known biller, payment generally cannot be sent electronically and must be sent via paper check. Payments sent non-electronically cause unwanted burdens and delays to users, payment systems, and payees.

In some situations, a payor may supply imperfect payee information to the bill payment system. Some known systems may fail to match imperfect payee information to the appropriate biller, and may cause payments not to be sent electronically. For example, if the payor submits a payment to a payee identified as "MasterCrd", a pure comparison of that payee name to the biller database will miss the proper biller "MasterCard".

Accordingly, a system and method for facilitating electronic payments by reducing non-electronic payments is desired. More particularly, a system and method for approximately matching entered payee information to stored biller information is desired.

BRIEF DESCRIPTION OF THE DISCLOSURE

In one aspect, a computer system for verifying payee information in an electronic payment is provided. The computer system includes a processor in communication with a database. The computer system is programmed to identify a plurality of billers from the database. Each biller of the plurality of billers includes biller information. The computer system is also programmed to receive a payee file that includes payee information identifying a payee. The payee issues a bill for payment to a payor. The computer system is further programmed to determine, by the processor, an approximate match score for each biller in a first set of billers of the plurality of billers by comparing the payee information to the biller information. The computer system is also programmed to identify a candidate list of billers from the first set of billers. Each of the billers included within the candidate list has an approximate match score indicating a likelihood of matching the payee information. The computer system is further programmed to adjust the candidate list of billers. Adjusting includes altering the match score of at least one candidate biller by comparing a payee account number of the payee information to an account mask associated with the at least one candidate biller. The computer system is also programmed to generate an output file of candidate biller information from the adjusted candidate list.

In another aspect, a computer-based method for verifying payee information in an electronic payment is provided. The method uses a computer device in communication with a database. The method includes identifying a plurality of billers from the database. Each biller of the plurality of billers includes biller information. The method also includes receiving a payee file that includes payee information identifying a payee. The payee issues a bill for payment to a payor. The method further includes determining, by the computer device, an approximate match score for each biller in a first set of billers of the plurality of billers by comparing the payee information to the biller information. The method also includes identifying a candidate list of billers from the first set of billers. Each of the billers included within the candidate list has an approximate match score indicating a likelihood of matching the payee information. The method further includes adjusting the candidate list of billers. Adjusting includes altering the match score of at least one candidate biller by comparing a payee account number of the payee information to an account mask associated with the at least one candidate biller. The method also includes generating an output file of candidate biller information from the adjusted candidate list.

In yet another aspect, at least one non-transitory computer-readable storage media having computer-executable instructions embodied thereon is provided. When executed by at least one processor, the computer-executable instructions cause the processor to identify a plurality of billers from a database. Each biller of the plurality of billers includes biller information. The computer-executable instructions further cause the processor to receive a payee file that includes payee information identifying a payee. The payee issues a bill for payment to a payor. The computer-executable instructions also cause the processor to determine, by the processor, an approximate match score for each biller of a first set of billers stored within a database by comparing the payee information to biller information stored within the database. The computer-executable instructions further cause the processor to identify a candidate list of billers from the first set of billers. Each of the billers included within the candidate list has an approximate match score indicating a likelihood of matching the payee information. The computer-executable instructions also cause the processor to adjust the candidate list of billers. Adjusting includes altering the match score of at least one candidate biller by comparing a payee account number of the payee information to an account mask associated with the at least one candidate biller. The computer-executable instructions further cause the processor to generate an output file of candidate biller information from the adjusted candidate list.

BRIEF DESCRIPTION OF THE DRAWINGS

FIG. 1 illustrates an example payment system for processing electronic payments using a payee verification processor in accordance with the present disclosure.

FIG. 2 is a schematic diagram of an example server system that may be used to implement the payee verification processor shown in FIG. 1.

FIG. 3 is a block diagram illustrating an example payee verification process that may be used by the system shown in FIG. 2.

FIG. 4 is a flow diagram of an example first stage of match score computation performed by the system shown in FIG. 2.

FIG. 5 is a flow diagram of an example second stage of match score adjustment performed by the system shown in FIG. 2.

FIG. 6 illustrates an example configuration of a server system that may be used to implement the system shown in FIG. 2.

FIG. 7 is a simplified block diagram of an example payment system for use with the system shown in FIG. 1.

FIG. 8 illustrates an example configuration of a database within a computing device, along with other related computing components, that may be used during the payee verification process.

DETAILED DESCRIPTION OF THE DISCLOSURE

Figure 1:
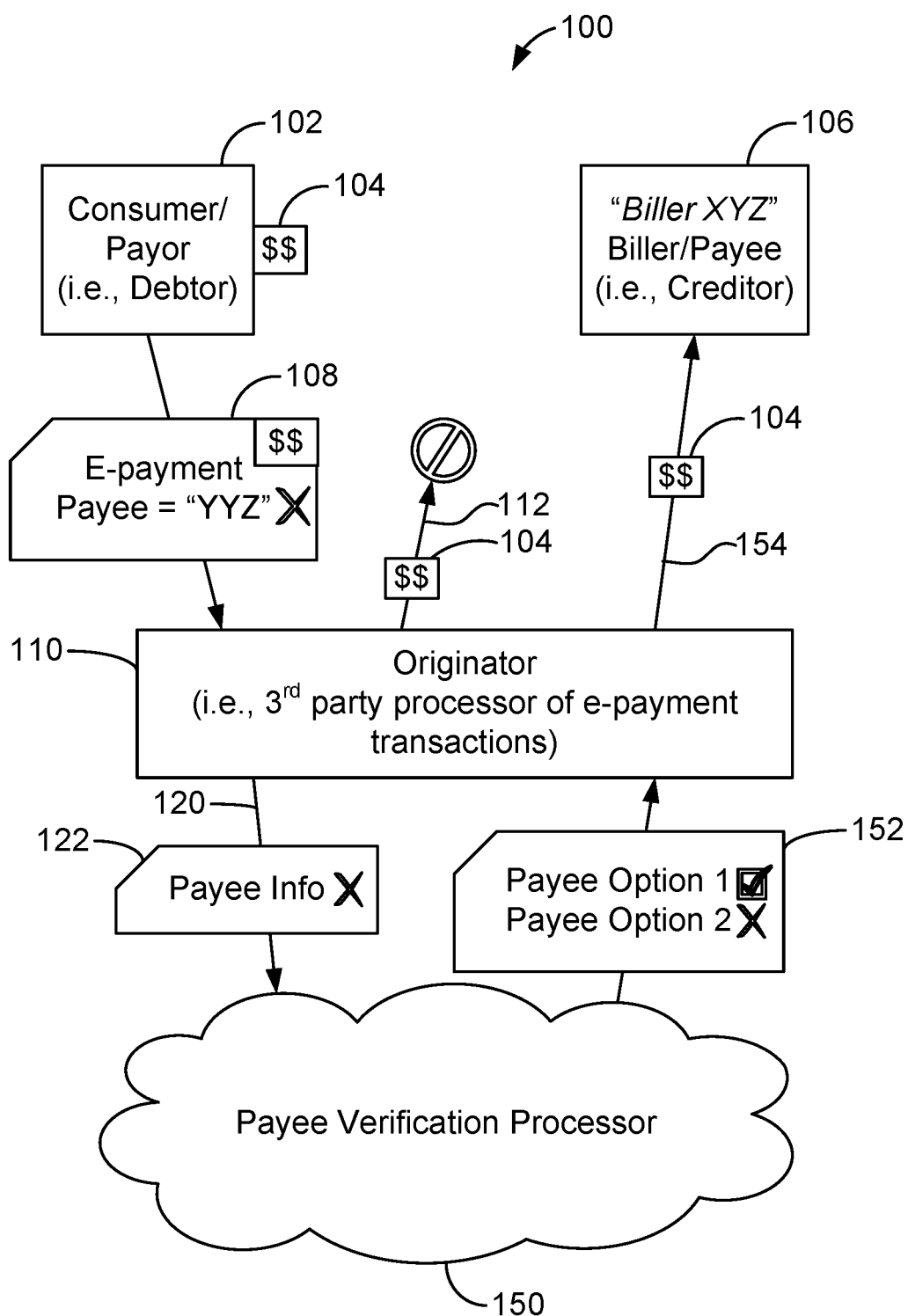
FIGS. 1-8 illustrate example embodiments of the methods and systems described herein.

Embodiments of the present disclosure facilitate the efficient transfer of money by identifying electronic payment methods that may be used to replace traditional and less effective payment methods. A biller database is provided that stores information about known billers to whom electronic payments may be sent. Biller information includes known billers registered within the system, wherein the biller information has been verified as accurate. A list of potential payments, including payee information, is compared with the biller information stored within the biller database to find approximate matches within the biller database. A matching score is determined based on the comparison of payees to billers or, more specifically, payee information to biller information. More particularly, a matching score is based on an approximation comparison of payee name, payee remittance address, payee state, and payee zip with corresponding biller information stored in the biller database. Further, payee consumer account number is analyzed by a formatting comparison process that further adjusts matching scores. A confidence score is generated based on the comparison of the paired payee and the biller. In some embodiments, the highest scoring biller is reported as a potential match back to the originator, along with an optional score for the biller, indicating that the billers may be the appropriate payee for the payment. In other embodiments, a list of the highest scoring billers and their corresponding confidence scores are reported as potential matches back to the originator. The originator may then analyze the highest biller or billers and determine to which biller the payment will actually be sent, thus increasing the number of payments that may be sent electronically.

In one embodiment, a computer program is provided, and the program is embodied on a computer readable medium, such as a non-transitory computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, or to a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL®, IBM® DB2, Microsoft® SQL Server, Sybase®, and PostgreSQL. However, any database may be used that enables the systems and methods described herein. (Oracle and MySQL are registered trademarks of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.) As used herein, the term "database system" refers specifically to a RDBMS.

FIG. 1 illustrates an example payment system 100 for processing electronic payments using a payee verification processor in accordance with the present disclosure. In the example embodiment, a payor 102 (i.e., a debtor) owes a payment 104 to a biller 106. Payor 102 may be, for example, a resident of a municipality that owes a payment 104 for residential electricity to a biller 106, the local electric company "Biller XYZ." Payor 102 utilizes online payment of bills through an originator 110. Originator 110 may be, for example, a banking institution that allows its customers to submit electronic payments.

To initiate an electronic payment, payor 102 submits electronic payment 108 to originator 110. In the example embodiment, payor 102 wants to target "Biller XYZ" to receive payment 104. Payor 102 includes information in electronic payment 108 that attempts to identify "Biller XYZ". However, in the example embodiment, payor 102 has misspelled the "payee" name sent in electronic payment 108.

In known systems involving processing of electronic payments, the originator's system may need to determine, from a list of billers that accept electronic payments, which biller the "payee" information may be directed. In the example embodiment, if originator 110 attempts to locate 112 a biller "YYZ", the electronic payment 108 will be improperly directed, or may find no match at all. Because of the misspelling of biller "XYZ" as "YYZ" in the electronic payment 108, no match is found in the biller database, and a direct mail check may be required.

To facilitate a greater tolerance for errors, missing information, or incomplete information, originator 110 may implement a payee verification processor 150. Originator 110 transmits 120 payee information 122 to payee verification processor 150. In the example embodiment, payee information 122 includes a payee name (e.g., "YYZ"). In other embodiments, discussed in greater detail below, payee information 122 may contain additional identifying information that may be leveraged to associate the payee with billers.

In the example embodiment, payee verification processor 150 compares payee information 122 to a database of billers (not shown in FIG. 1). Based on the comparison, payee verification processor 150 generates a list 152 of potential payees to which the electronic payment 108 may be directed. List 152 represents a list of billers that most closely match the information provided in electronic payment 108. The list 152 may be analyzed by a human analyst or computer processor that compares the payee information in electronic payment 108 to the closest matches in list 152, and who then may pick one of the billers to use, and then transmit 154 the payment 104. Use of the payee verification processor 150 has, in this example embodiment, allowed an otherwise-imperfect electronic payment 108 to be properly matched to the appropriate biller 106.

Figure 2:
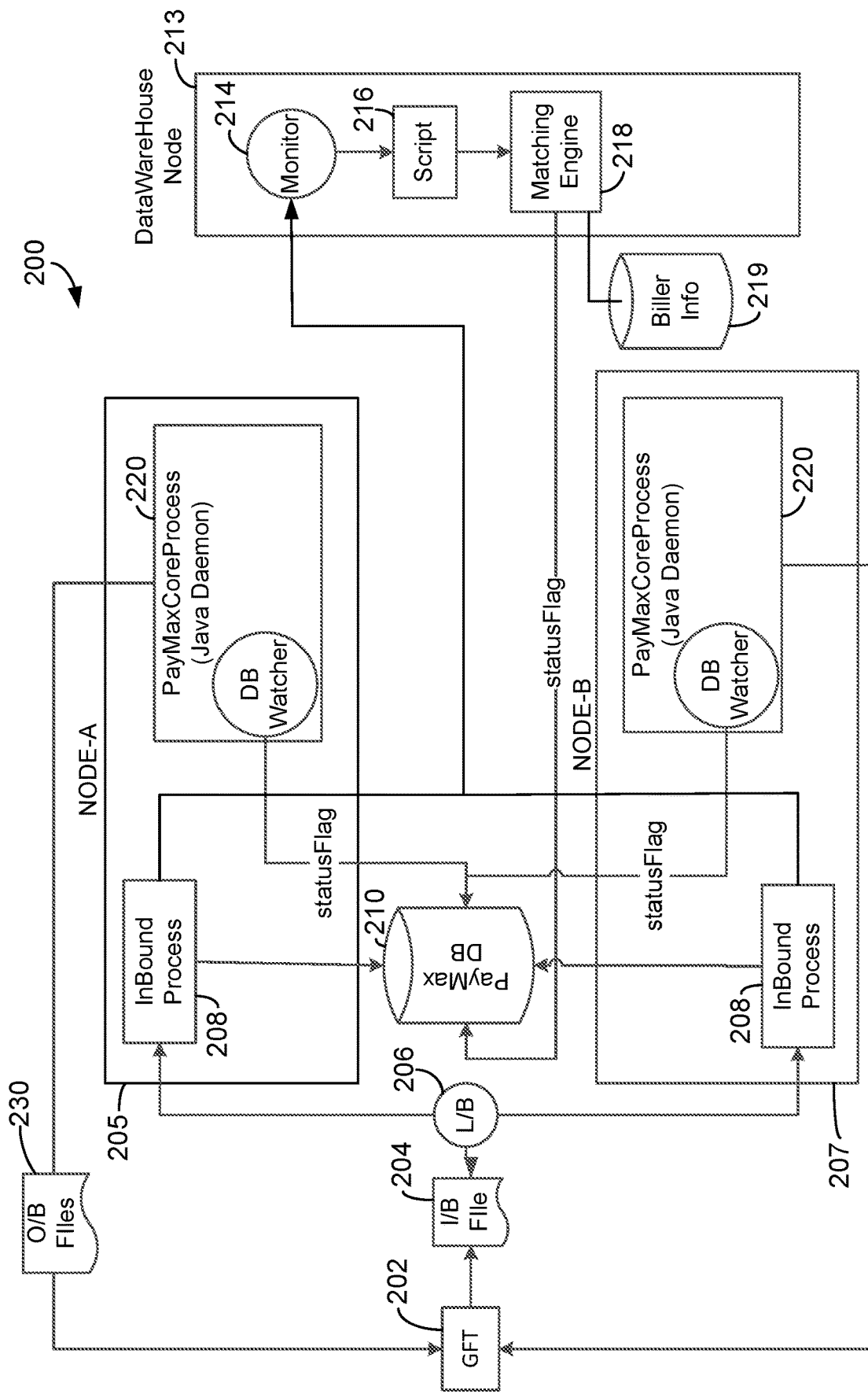

FIG. 2 is a schematic diagram of an example server system 200 that may be used to implement payee verification processor 150 (shown in FIG. 1). In the example embodiment, when an originator 110 (shown in FIG. 1) receives a request for an electronic payment 108 (shown in FIG. 1), originator 110 generates and transmits a payee file 204 to payment system 200. Originator 110 may be a customer of the operator of payment system 200, the operator of payment system 200, or any other party. For example, originator 110 may be a bank, a bill presentment and payment service, and/or a bill payment aggregator. Customers, or payors, such as payor 102 (shown in FIG. 1), make payment(s) and provide payee information to originator 110, e.g., online or in person. For example, a payor 102 could give an amount due (i.e., from a bill) to a payee (e.g., a utility company, a cell phone company, etc.) to originator 110 with payee information.

In the example embodiment, originator 110 provides a payee file 204 to a gateway processor 202 of server system 200. Payee file 204 contains one or more payee records to be analyzed by payment system 200. For example, payee file 204 may contain pipe-delimited text in a header record (see Table 1), one or more detail records (see Table 2), and a trailer record (see Table 3). Alternatively, or additionally, payee file 204 may be in any format that enables payment system 200 to function as described herein. The records shown herein in Tables 1, 2, and 3 are illustrative only and are not intended to be exhaustive or limiting. Payee file 204 could include other data without departing from the scope of the present disclosure.

TABLE 1

Header Record

| Field | Field Number | Usage |
|---|---|---|
| Record Type Indicator | 1 | A literal value of '1' |
| Originator RPPSID | 2 | A valid Registered Bill Pay Originator ID |
| Transmission Date | 3 | MMDDCCYY |
| Transmission Time | 4 | HHMM |
| Line of Business | 5 | RB-Remote Banking; CC-Credit Counseling |

TABLE 2

Detail Record

| Field | Field Number | Usage |
|---|---|---|
| Record Type Indicator | 1 | A literal value of '6' |
| Payee Name | 2 | Field could be empty |
| Payee Street Address 1 | 3 | Field could be empty |
| Payee Street Address 2 | 4 | Field could be empty |
| Payee City | 5 | |
| Payee State | 6 | |
| Payee Zip / Zip + 4 | 7 | |
| Payee Consumer Account Number | 8 | |
| Originator DB Key 1 | 9 | Field could be empty |
| Originator DB Key 2 | 10 | Field could be empty |
| Originator DB Key 3 | 11 | Field could be empty |
| Originator DB Key 4 | 12 | Field could be empty |

TABLE 3

Trailer Record

| Field | Field Number | Usage |
|---|---|---|
| Record Type Indicator | 1 | A literal value of '9' |
| Originator RPPSID | 2 | A RPPSID same is in file header |
| Total number of records | 3 | Total of all detail records |

Payee information in payee file 204 may be provided by payors 102 and may contain errors, such as spelling errors, transposition errors, use of payee nicknames rather than official names (i.e., "MC" for "MasterCard®"), and/or omissions. In addition, payee information provided by payor 102 may be out-of-date, such as when a payee moves or changes names. System 200 improves the quality and number of matches between provided payee information and payees actually capable of receiving electronic payments (also referred to herein as "balers" or "biller information"), thereby facilitating increased usage of electronic payments by identifying payees capable of receiving electronic payments.

System 200, in the example embodiment, includes a load balancer 206 that monitors a file system for new payee files 204. More particularly, upon receiving a new payee file 204 from gateway processor 202, load balancer 206 distributes payee file 204, or portions thereof, to a first node 205 and/or a second node 207 upon receipt. While a two node cluster is depicted in FIG. 2 (i.e., first node 205 and second node 207), it should be understood that any number of nodes that facilitate the systems and methods described herein may be used. Further operations are discussed as processed by a single node of the cluster.

Each node of the cluster contains an inbound process 208 that receives inbound file 204, or portion thereof, validates and extracts the transaction information from inbound file 204 based on the above-discussed formatting template. Each transaction is then stored in PayMax database 210. In this example embodiment, each transaction of inbound file 204 is tagged with the same batch ID. This batch ID allows the batch of transactions from inbound file 204 to be referenced by the batch ID and processed together. Inbound process 208 then transfers control for subsequent processing.

In the example embodiment, system 200 includes a data warehouse node 213 of system 200. Data warehouse node 213 includes a monitor 214 that watches for output from inbound process 208 of the cluster in PayMax database 210, which serves as a process flow control mechanism, facilitating an exchange of processing from inbound process 208 to data warehouse node 213. It should be understood, however, that any control transfer mechanism that facilitates the systems and methods described herein may be used. Script 216 then utilizes a matching engine 218, as discussed in greater detail below, to generate similarity comparisons between fields of payee information to fields of biller information. In some embodiments, matching engine 218 utilizes SAS® for some or all computational operations. (SAS is a registered trademark of SAS Institute Corporation, of Cary, North Carolina.) Alternatively, any computing language that enables the systems and methods described herein may be used.

During comparison, matching engine 218 compares fields of payee information to corresponding fields of biller information. For each field of comparison, such as "name" or "address", a match score is generated for each biller in a biller database 219. Match scores represent a numeric value weighing the similarity of that biller's field to the corresponding payee field. In the example embodiment, a payee's "name" and "address" field are compared to the names and addresses of billers in biller database 219. The calculations of match scores are discussed in greater detail with regard to FIG. 4 below.

In the example embodiment, matching engine 218 returns the ten most similar billers in biller database 219 to PayMax database 210, along with their respective match scores. These ten most similar billers are also referred to herein as "candidate billers". The results from matching engine 218 will be entered into PayMax database 210 for each transaction. Upon completion of the process, matching engine 218 updates a status flag in PayMax database 210 for the batch of transactions, signifying that the transactions are ready for the next stage of processing.

The cluster nodes 205, 207, in the example embodiment, include a core process 220 that monitors PayMax database 210 for records with updated status flags. The update of the status flag by matching engine 218 acts to engage core process 220 to continue further processing for the transaction. It should be understood, however, that other process flow control mechanisms may be used.

Core process 220 examines account information. Each candidate biller's score may be further adjusted based on similarity of account numbers. More particularly, in this example embodiment, core process 220 analyzes a transaction's account information against each of the candidate billers' account mask information. Each candidate biller's aggregate score is adjusted up or down based on comparing the transaction's account information to the biller's account format. The account information comparison process and associated match score adjustment is discussed in greater detail with reference to FIG. 5 below.

Once each candidate biller's aggregate score has been adjusted based on account information, core process 220 prepares one or more outbound files 230 with final results of the analysis. In the example embodiment, core process 220 prepares two outbound files 230, one file for "matches" and another file for "non-matches". Generally, each transaction from inbound file 204 will have a single outbound response record, and that record will appear either in the matches file or in the non-matches file. More specifically, the matches file will include the single highest scoring biller from the candidate billers for each transaction.

However, several types of situations may warrant exclusion of a transaction from the matches file (i.e., recording the transaction as a "miss" in the non-matches file). For example, an originator 110 may decide that a match score below a certain threshold is too remote to warrant consideration as a "match," and requests system 200 to report any candidate biller below that threshold as a "miss" rather than a match. System 200, in the example embodiment, maintains a configurable database of "match score thresholds" for each originator 110. If the highest candidate biller's match score is below the submitting originator's 110 threshold, system 200 will return that transaction in the non-matches file, and not in the matches file.

In the example embodiment, output files 230 contain pipe-delimited text in a header record (see Table 4), one or more detail records (see Table 5), and a trailer record (see Table 6). Additionally, detail records in output files 230 may contain unedited information from corresponding detail records in inbound file 204.

TABLE 4

| Header Record | | |
| --- | --- | --- |
| Field | Field Number | Usage |
| Record Type Indicator | 1 | A literal value of '1' |
| Originator RPPSID | 2 | Valid Registered Bill Pay Originator ID |
| Transmission Date | 3 | MMDDCCYY |
| Transmission Time | 4 | HHMM |
| Line of Business | 5 | RB-Remote Banking; CC-Credit Counseling |
| Full File Error | 6 | An error message |

TABLE 5

Detail Record

| Field | Field Number | Usage |
|---|---|---|
| Record Type Indicator | 1 | A literal value of '6'. |
| Payee name | 2 | Data is populated from the originator's inbound file. |
| Payee Street Address 1 | 3 | Data is populated from the originator's inbound file. |
| Payee Street Address 2 | 4 | Data is populated from the originator's inbound file. |
| Payee City | 5 | Data is populated from the originator's inbound file. |
| Payee State | 6 | Data is populated from the originator's inbound file. |
| Payee Zip/Zip + 4 | 7 | Data is populated from the originator's inbound file. |
| Payee Consumer Account Number | 8 | Data is populated from the originator's inbound file. |
| Originator DB Key 1 | 9 | Data is populated from the originator's inbound file. |
| Originator DB Key 2 | 10 | Data is populated from the originator's inbound file. |
| Originator DB Key 3 | 11 | Data is populated from the originator's inbound file. |
| Originator DB Key 4 | 12 | Data is populated from the originator's inbound file. |
| Biller ID or Error | 13 | A matched biller ID or an error message. |
| Overall Level of Confidence | 14 | Data is populated for an overall level of confidence that is the Match score for highest candidate biller. |
| Revised Payee Account Number | 15 | Data is populated for an account number if a payee record is assigned a match and the payee consumer account number had to be manipulated to match an RPPS account mask. |
| Payment Creation Type | 16 | Data is populated for electronic payment if a biller ID is assigned to a payee record during the matching process. |

TABLE 6

Trailer Record

| Field | Field Number | Usage |
|---|---|---|
| Record Type Indicator | 1 | A literal value of '9'. |
| Originator ID | 2 | Same as header record; originator ID. |
| Total number of records | 3 | Total of all processed detail records. |

PayMax database 210 may also store the preferred format of consumer account numbers as an account mask. For example, a consumer account number may be in the form of "E-123456789". However, a biller 106 may prefer to receive account numbers with the "E-" portion omitted. Accordingly, system 200 may, based on the account number formats/masks stored in PayMax database 210, alter the format of consumer account numbers. Continuing the example above, output file 230 would contain the consumer account number "123456789" rather than "E-123456789". If a consumer account number is modified by system 200 (e.g., because the account number changed and/or to match a preferred format), output file 230 may contain, for each payee detail record, the originally-input consumer account number, the altered consumer account number, and/or an indication that the account number was altered.

Once all of inbound file 204 transactions have been processed into the matches file and the non-matches file, the two output files 230 are returned to originator 110 by gateway processor 202.

It should be understood that PayMax database 210 and biller information database 219 are described herein as separate databases for illustrative purposes, but that in some embodiments there may be performance benefits to having the transactions information and the biller information in the same logical database managed by a single relational database management system. Further, it should be understood that system 200 is described herein, for illustrative purposes, as processing a single transaction, but that in some embodiments, system 200 may realize performance benefits by processing transactions in batches.

Figure 3:
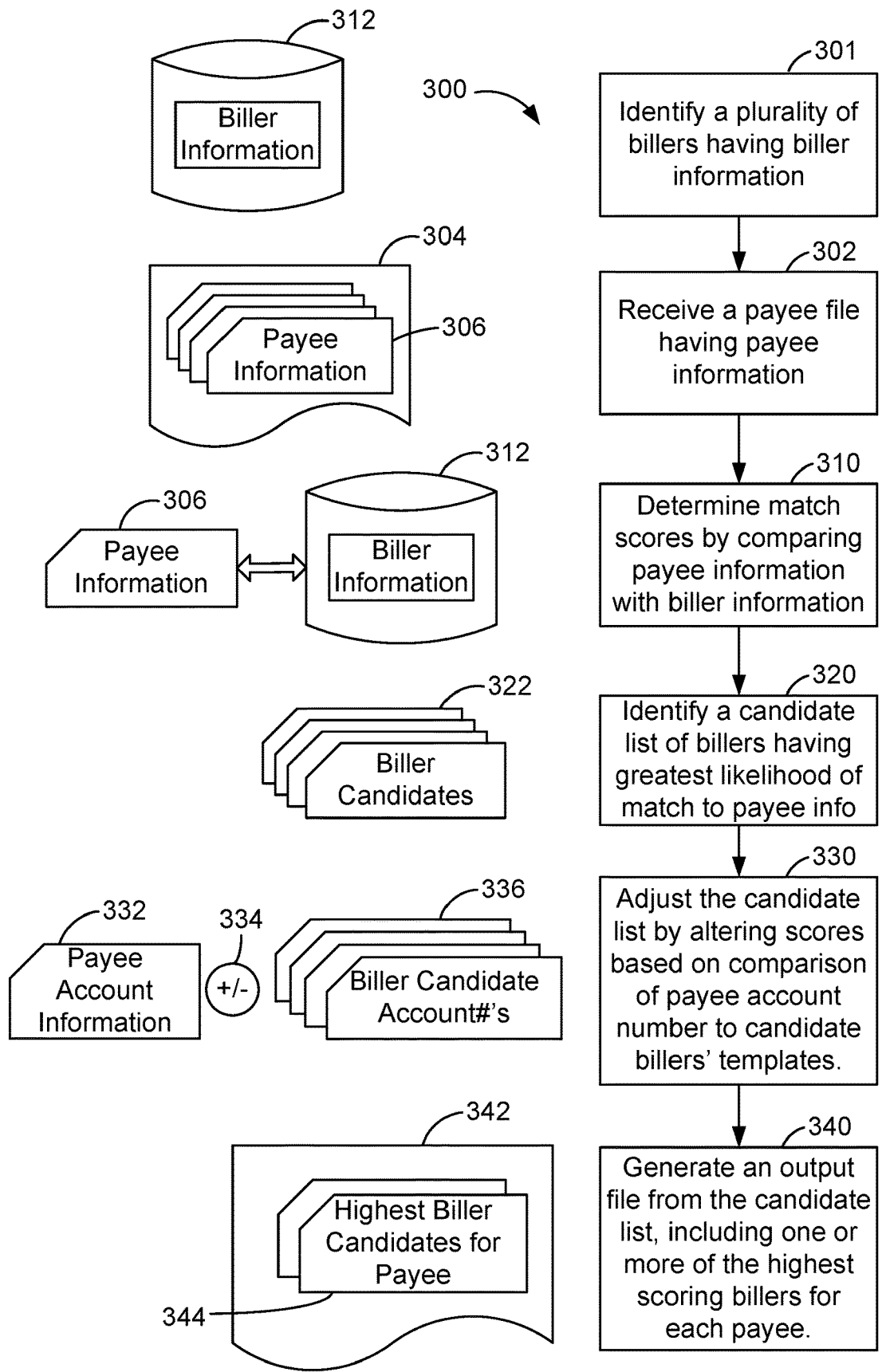

FIG. 3 is a block diagram illustrating an example payee verification process 300 that may be used by system 200 (shown in FIG. 2). A plurality of billers is identified 301, where each biller includes biller information. In some embodiments, the biller information is stored in biller database 312. A payee file 304, such as payee file 204 (shown in FIG. 2), is received 302. Payee file 304 includes payee information 306 associated with pending transactions. Such payee information 306 includes a payee name, a payee address, a payee state and zip code, and a payee account number. However, such payee information may be inaccurate, incomplete, misspelled, or otherwise imperfect.

In the example embodiment, for each transaction in payee file 304, approximate match scores for each biller in a biller database 312 are determined 310 by comparing a given set of payee information 306 to biller information in biller database 312. Approximate match score determination is discussed in greater detail below. From the match scores, a list of biller candidates 322 are identified 320. The list of biller candidates 322 represents a subset of billers from the biller information database 312 that are the most similar to the payee information (i.e., that have the greatest likelihood of being a match to the payee information), and thus may be the intended target of the transaction.

Each biller candidate 322 has an approximate match score, as calculated above, and may also have an associated account template 336. For example, one of the candidate billers, "Biller XYZ", may have an account template such as "99-9999". Payee information 306 also includes a payee account number 332, which may be compared to each candidate biller's account templates 336. Adjustments 330 to the candidate list may be made by altering 334 match scores of the biller candidates 322 up or down by comparing the payee account number 332 to candidate biller account templates 336. Such alterations may be made by a process such as core process 220 (shown in FIG. 2) as discussed above. If, for example, a payee account number 332 is "12-0348", then this positive correlation between the payee account number and the "Biller XYZ" account template increases the likelihood that "Biller XYZ" is the intended target of the transaction. Thus, that particular biller candidate's match score is altered 334 to reflect the account number match. The account information comparison process and associated match score adjustment is discussed in greater detail in reference to FIG. 5 below.

Once each biller candidate 322 has been adjusted 330 based on account number similarity to payee account information 332, one or more output files 342, such as output files 230 (shown in FIG. 2) are generated 340. In the example embodiment, the output file 342 includes the highest biller candidate 344 for each transaction. In other embodiments, output file 342 includes multiple biller candidates 344 for each transaction that meet a minimum threshold. If no biller candidates 344 meet that threshold, then either no response to the transaction is provided, or the transaction is noted in a second output file (not shown) indicating that no suitable matches were found. The output file is then sent back to the originator, such as originator 110 (shown in FIG. 1).

In the event that more than one biller candidates 344 are identified, the biller with the highest matching score should be assigned as the best possible match. In the event that the matching score is the same for more than one biller candidate 344, the biller with the highest payee consumer account number score should be assigned as the best possible match. In the event that the matching score and the payee consumer account number score are the same for more than one match, the match with the highest combined payee state and payee zip scores should be assigned as the best possible match.

In the event that the matching score, the payee consumer account number score, and the combined payee state and zip scores are the same for more than one biller candidate 344, the biller with the highest payee name score, in the example embodiment, is assigned as the best possible match. In the event that the matching score, the payee consumer account number score, the combined payee state and zip scores, and the payee name score are the same for more than one biller candidate 344, the first biller identified as a candidate should be assigned as the best possible match.

A pre-determined matching score threshold may be used to determine whether the best possible match should be reported, i.e., in output files 230, as a match. If the best possible match for a payee does not meet or exceed the pre-determined matching score threshold, no match is reported. Each originator 110 may have a pre-determined match score threshold that may be stored in biller database 219. If the best possible match for a payee does not meet or exceed the pre-determined confidence score threshold, no match should be made.

Figure 4:
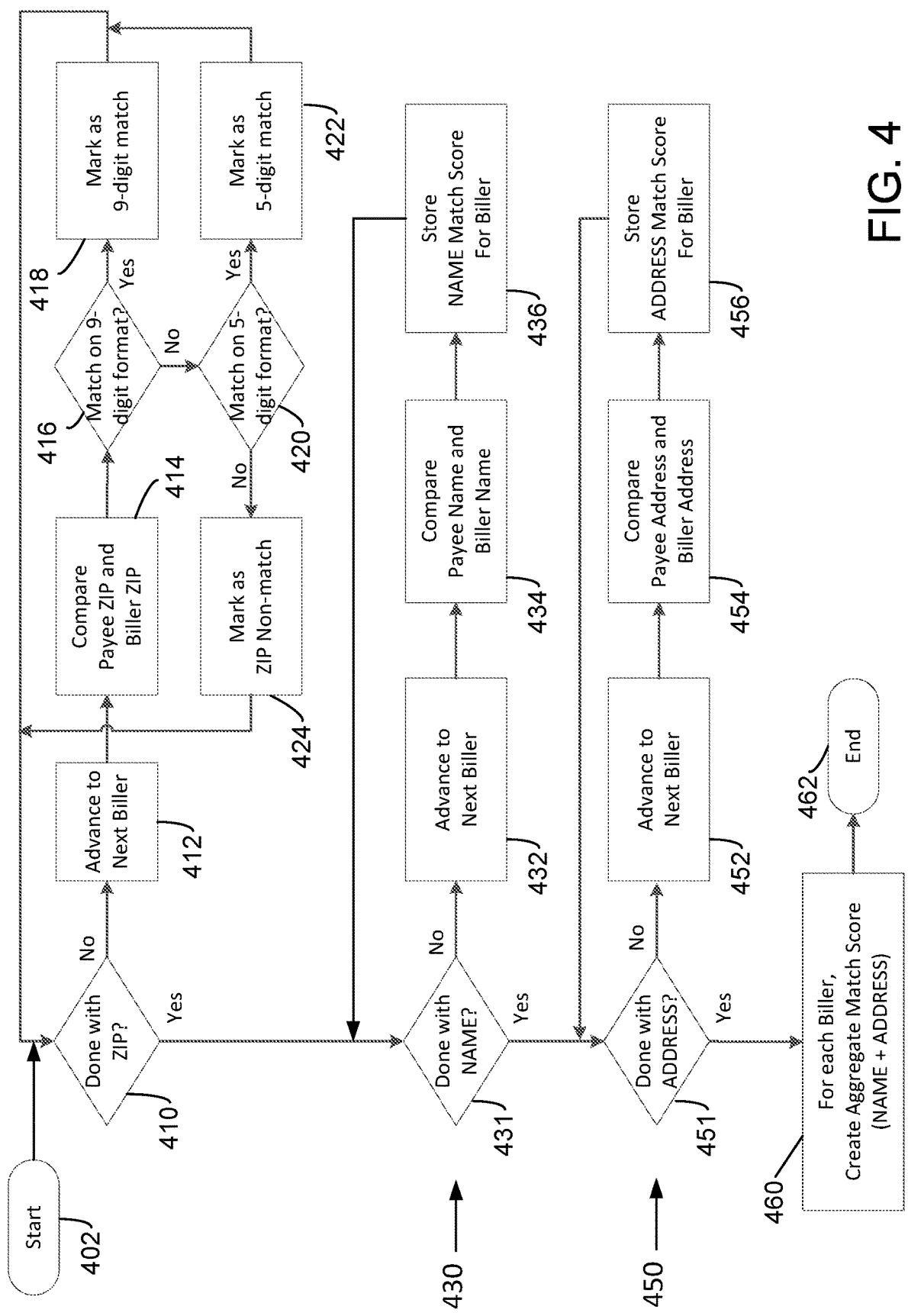
Figure 5:
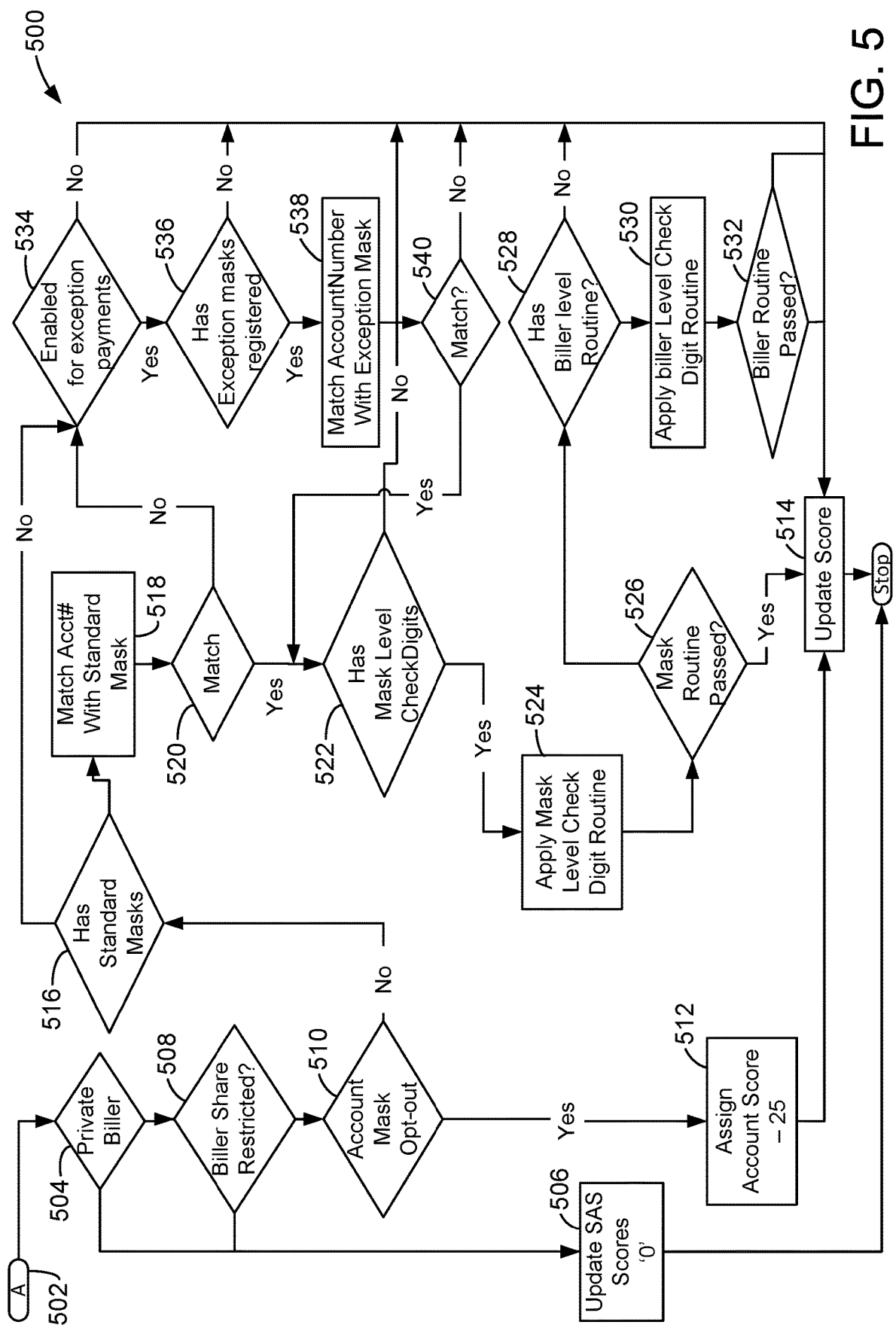

FIGS. 4 and 5 illustrate the two computational steps involved in calculating billers' match scores during analysis of an individual transaction. During the first computational step, match scores are initially created for a subset of billers by matching engine 218 (shown in FIG. 2) using, for example, name, street address, state, and zip code. FIG. 4 illustrates an example of the initial score generation. During the second computational step, match scores are further adjusted by core process 220 based on account mask and check digit comparison with the account number. FIG. 5 illustrates an example flow diagram for adjustment to match scores based on account mask.

Referring to FIG. 4, flow diagram 400 illustrates an example first stage of match score computation. Match scores computed by the process of flow diagram 400 may be determined 310 (shown in FIG. 3) by a component such as matching engine 218 (shown in FIG. 2). Payee information, such as payee information 306 (shown in FIG. 3), is compared to biller information stored in a database such as biller information database 312 (shown in FIG. 3). Payee information and biller information includes name, address, state, and zip code, collectively referred to herein as "fields" of data. Each field of data is compared to corresponding fields of biller data. Each comparison results in an individual score for that field. Each comparison may also impact an aggregate score that involves multiple fields.

In the example embodiment, the match score calculation starts 402 with zip code information. At operation 410, if the process of zip code analysis is not yet complete, then the process advances 412 to the next biller. The process compares 414 the payee's ZIP code and the biller's ZIP code. If 416 the ZIP codes match on a full 9-digit format (i.e., United States extended zip code format "99999-9999"), then biller is marked 418 as matching on 9 digits, and the process continues to the next biller. Otherwise, if 420 biller matches on 5-digit format (i.e., United States standard zip code format "99999"), then biller is marked 422 as matching on 5 digits, and the process continues to the next biller. Otherwise, the biller is marked 424 as not matching on zip codes, and the process continues to the next biller until complete.

Once all billers for a transaction have been analyzed by ZIP code, the process will analyze 430 name information and analyze 450 address information. In the example embodiment, the process utilizes a common approach to both name and address analysis 430, 450. In this embodiment, the analysis involves an approximate matching methodology described in U.S. Pat. No. 8,219,550, issued 10 Jul. 2012 to Merz, et al., which is hereby incorporated by reference in its entirety.

This approximate matching methodology utilizes a technique of string comparison that captures, mathematically, the linguistic concept of "nearness", as applied to biller names and addresses. For example, two transactions may be presented to system 200 (shown in FIG. 2) as:

TABLE 7

Example Transaction Record Data Fields

| RECNUM | NAME | STREET ADDRESS | CITY | STATE | ZIP |
|---|---|---|---|---|---|
| 1 | Wally Lo Faro | 909 N 10th St | Boise | ID | 83702 |
| 2 | Walter LoFaro | 909 North 10th Street | Stanley | ID | 83706 |

These transactions may refer to the same biller, "Walter Lo Faro" of Idaho, but the only exact match is the state. In some embodiments, the data may be standardized by common methods known in the art in order to facilitate better string comparison. In the example embodiment, address standardization is an algorithm implemented in SAS that uses a database table to standardize tokens parsed from the address. City name standardization uses postal codes to assign preferred city names corresponding to one or more zip codes in proximity to each other. Further, both names and addresses are converted to all capital letters. For example, after some common standardization techniques are applied, the two transactions may be stored as:

TABLE 8

Example Standardized Transaction Record Data Fields

| RECNUM | NAME | STREET ADDRESS | CITY | STATE | ZIP |
|---|---|---|---|---|---|
| 1 | WALLY LO FARO | 909 N 10TH ST | BOISE | ID | 83702 |
| 2 | WALTER LOFARO | 909 N 10TH ST | BOISE | ID | 83706 |

After standardization, string comparison begins. In the example embodiment, "n-grams" are used to compare name and address information between the payee information (i.e., the transaction information) and biller information. An n-gram, generally, is a substring of length n. More specifically, n-grams are used to break up a string into constituent components that may be used for further analysis. In some embodiments, n-grams of length "2" are used (i.e., "2-grams"). For example, the name "WALLY" generates the following 2-grams: "_W", "WA", "AL", "LL", "LY", and "Y_". It should be understood, however, that other length n-grams may be used may be used with this system.

Further, in the example embodiment, 2-grams may be converted to a mathematical integer. For example, let's suppose out character set contains 37 elements: the alphabet, the digits, and the space. Then there would be 37*37=1369 possible 2-grams. Order the 2-grams AA, AB, . . . , AZ, A0, . . . , A9, A_, BA, . . . , B_, . . . ,A_, . . . , _ _. For any string define the string's 2-gram vector representation to be the vector:

$$v=(v_1, v_2, \ldots, v_{1369})$$

where $v_i$=the number of times the $i^{th}$ 2-gram appears in the string. For WALLY we have:

TABLE 9

Example 2-gram Order for "WALLY"

| 2-gram | 2-gram's order |
|--------|----------------|
| WA     | 851            |
| AL     | 12             |
| LL     | 456            |
| LY     | 469            |

The 2-gram vector representation of WALLY is then the vector v above with all of the components $v_i$=0 except for i in {12, 456, 469, 851} where $v_i$=1. Representing v in the data as an array consisting primarily of 0s is wasteful. In practice, there are rows in a data set for each nonzero 2-gram (the $v_i$ from above).

TABLE 10

Example Term Count for 2-grams in "WALLY"

| String | 2-gram | term count |
|--------|--------|------------|
| WALLY  | AL     | 1          |
| WALLY  | LL     | 1          |
| WALLY  | LY     | 1          |
| WALLY  | WA     | 1          |
| ABAB   | AB     | 2          |
| ABAB   | BA     | 1          |

No information is lost during this process. Conversion back to the vector representation v is possible. In operation, we want to know if, for a given name and address pair, whether a 2-gram came from the name or the address. Below are the rows for the data in our original example.

TABLE 11

Example 2-grams for Two Example Payees

| recnum | 2-gram | term type | term count | recnum | 2-gram | term type | term count |
|--------|--------|-----------|------------|--------|--------|-----------|------------|
| 1 | _W | 1 | 1 | 2 | _W | 1 | 1 |
| 1 | WA | 1 | 1 | 2 | WA | 1 | 1 |
| 1 | AL | 1 | 1 | 2 | AL | 1 | 1 |
| 1 | LL | 1 | 1 | 2 | LT | 1 | 1 |
| 1 | LY | 1 | 1 | 2 | TE | 1 | 1 |
| 1 | Y_ | 1 | 1 | 2 | ER | 1 | 1 |
| 1 | _L | 1 | 1 | 2 | R_ | 1 | 1 |
| 1 | LO | 1 | 1 | 2 | _L | 1 | 1 |
| 1 | O_ | 1 | 2 | 2 | LO | 1 | 1 |
| 1 | _F | 1 | 1 | 2 | OF | 1 | 1 |
| 1 | FA | 1 | 1 | 2 | FA | 1 | 1 |
| 1 | AR | 1 | 1 | 2 | AR | 1 | 1 |
| 1 | RO | 1 | 1 | 2 | RO | 1 | 1 |
| 1 | _9 | 2 | 1 | 2 | O_ | 1 | 1 |
| 1 | 90 | 2 | 1 | 2 | _9 | 2 | 1 |
| 1 | 09 | 2 | 1 | 2 | 90 | 2 | 1 |
| 1 | 9_ | 2 | 1 | 2 | 09 | 2 | 1 |
| 1 | _N | 2 | 1 | 2 | 9_ | 2 | 1 |
| 1 | N_ | 2 | 1 | 2 | _N | 2 | 1 |
| 1 | _1 | 2 | 1 | 2 | N_ | 2 | 1 |
| 1 | 10 | 2 | 1 | 2 | _1 | 2 | 1 |
| 1 | 0T | 2 | 1 | 2 | 10 | 2 | 1 |
| 1 | TH | 2 | 1 | 2 | 0T | 2 | 1 |
| 1 | H_ | 2 | 1 | 2 | TH | 2 | 1 |
| 1 | _S | 2 | 1 | 2 | H_ | 2 | 1 |
| 1 | ST | 2 | 1 | 2 | _S | 2 | 1 |
| 1 | T_ | 2 | 1 | 2 | ST | 2 | 1 |
|   |    |   |   | 2 | T_ | 2 | 1 |

In one embodiment, a measure of string similarity using 2-grams would simply be to count the number of 2-grams shared by two strings. For WALLY and WALTER, this would equal 2. For example, the strings ABAC, ABACC, ABACCC, . . . all share two 2-grams with ABA but each string in the sequence is less similar to ABA than the preceding one. The measure of string similarity may be refined to take into account strings of varying length. Further, the measure may be rescaled (divide it by something) so that identical strings have similarity equal to 1. For example:

similarity (string1, string2) = 1

$$\Rightarrow 1 = \frac{\text{Number of 2 - grams in common}}{(\text{junk involving string 1})(\text{junk involving string 2})}$$

If string1 and string2 are the same then they have the same number of 2-grams, say n of them.

$$\Rightarrow \frac{n}{(\text{junk involving string1})^2} = 1$$

$$\Rightarrow (\text{junk involving string1})^2 = n$$

$$\Rightarrow (\text{junk involving string1}) = \sqrt{n}$$

In one embodiment, a measure of string similarity is defined as:

similarity (string1, string2) =

$$\frac{\text{number of shared 2 - grams}}{\sqrt{\text{number of 2 - grams in string1}} \sqrt{\text{number of 2 - grams in string2}}}$$

Identical strings now have similarity equal to 1. Further, for example, the similarity of "WALTER" and "WALLY" is approximately 0.447.

The above is one embodiment of a string similarity function. In another embodiment, the possibility of repeated 2-grams may be addressed, as well as strings sharing uncommon 2-grams, like CZ should be more similar than those only sharing common ones like TH or LE. Suppose we have two strings to compare and they have 2-gram vector representations:

$v = (v_1, v_2, \ldots, v_{1369})$ $u = (u_1, u_2, \ldots, u_{1369})$

Our previous versions of string similarity have not used the vector components. If you look you will not see any $u_i$ anywhere in the formulas. Remember that $u_i$ is the total number of occurrences of the $i^{th}$ 2-gram in the string so incorporating it into our formula will address the first issue. Here is another embodiment of a measure of similarity:

$$\text{similarity (string1, string2)} = \frac{\sum_{i=1}^{1369} u_i v_i}{\sqrt{\sum_{i=1}^{1369} u_i^2} \sqrt{\sum_{i=1}^{1369} v_i^2}}$$

The new numerator deals with repeated 2-grams while the new denominator rescales it so identical strings still have a similarity of 1. Further, this may be described as the cosine of the angle between the vectors u and v. The numerator is the dot product (inner product) of the vectors and the denominator is the product of their lengths. This puts our similarity in the realm of linear algebra and we can now bring to bear all of the tools of the field on the matching problem. For example, the un-weighted 2-gram similarity between ABABC' and 'ABD' is 0.57735027, and between 'ABABC' and 'ABABD' is 0.83333333.

For the second issue, an idea from the field of text mining may be used. As it stands now, each 2-gram makes an equal contribution into the similarity score. Another way to say this is that the 2-grams are equally weighted. The basic idea behind term frequency-inverse document frequency (TF/IDF) weighting is that the highest weighted 2-grams are those that occur most often in a small set of strings.

The term frequency for a 2-gram in a string is something we've already seen and we have several equivalent ways to describe it: (a) it is the number of times a 2-gram occurs in a string; (b) it is the field term_count in the example data above; and (c) it is the component $v_i$ from the vector representation of the string, where the 2-gram in question is the $i^{th}$ one. Inverse document frequency is the adjustment we give those weights to account for a 2-gram's relative uniqueness in the master data set and it is defined as:

$$\text{IDF of the 2-gram } XY = \log_{10} \frac{\text{total number of strings in the master data}}{1 + \text{number of strings containing } XY}$$

Here XY stands for any 2-gram. The rarer XY is in the master set of strings, the smaller the denominator and since the numerator is constant we get what we wanted: rarer 2-grams yielding larger weights. The "1+" is there to avoid potential division by 0 issues; it does not affect the value of the weight significantly. The logarithm is there to reduce the range of possible weights and to smooth them out. We can now define the TF/IDF-weighted 2-gram vector representation of a string as:

$v = (v_1, v_2, \ldots, v_{1369})$ where:

$v_i$ = (term frequency of $i^{th}$ 2-gram in the string)*(IDF of $i^{th}$ 2-gram in the master)

In plain English, all we've done multiply the term by term the weights by the appropriate IDFs. Finishing our example based on the name "WALLY LO FARO":

TABLE 13

Example 2-gram Weights

| rec num | 2-gram | term type | term count | 2-gram weight | rec num | 2-gram | term type | term count | 2-gram weight |
|---|---|---|---|---|---|---|---|---|---|
| 1 | _W | 1 | 1 | 1.34157 | 2 | _W | 1 | 1 | 1.34157 |
| 1 | WA | 1 | 1 | 1.42929 | 2 | WA | 1 | 1 | 1.42929 |
| 1 | AL | 1 | 1 | 0.82517 | 2 | AL | 1 | 1 | 0.82517 |
| 1 | LL | 1 | 1 | 0.93024 | 2 | LT | 1 | 1 | 1.44582 |
| 1 | LY | 1 | 1 | 1.50429 | 2 | TE | 1 | 1 | 0.91807 |
| 1 | Y_ | 1 | 1 | 0.86584 | 2 | ER | 1 | 1 | 0.64556 |
| 1 | _L | 1 | 1 | 1.06145 | 2 | R_ | 1 | 1 | 0.91512 |
| 1 | LO | 1 | 2 | 1.19318 | 2 | _L | 1 | 1 | 1.06145 |
| 1 | O_ | 1 | 1 | 1.17492 | 2 | LO | 1 | 1 | 1.19318 |
| 1 | _F | 1 | 1 | 1.14269 | 2 | OF | 1 | 1 | 1.43168 |
| 1 | FA | 1 | 1 | 1.54156 | 2 | FA | 1 | 1 | 1.54156 |
| 1 | AR | 1 | 1 | 0.75258 | 2 | AR | 1 | 1 | 0.75258 |
| 1 | RO | 1 | 1 | 1.03955 | 2 | RO | 1 | 1 | 1.03955 |
| 1 | _9 | 2 | 1 | 1.95164 | 2 | O_ | 1 | 1 | 1.17492 |
| 1 | 90 | 2 | 1 | 1.49506 | 2 | _9 | 2 | 1 | 1.95164 |
| 1 | 09 | 2 | 1 | 1.67481 | 2 | 90 | 2 | 1 | 1.49506 |
| 1 | 9_ | 2 | 1 | 1.11125 | 2 | 09 | 2 | 1 | 1.67481 |
| 1 | _N | 2 | 1 | 0.86686 | 2 | 9_ | 2 | 1 | 1.11125 |
| 1 | N_ | 2 | 1 | 0.63231 | 2 | _N | 2 | 1 | 0.86686 |
| 1 | _1 | 2 | 1 | 1.02324 | 2 | N_ | 2 | 1 | 0.63231 |
| 1 | 10 | 2 | 1 | 0.90418 | 2 | _1 | 2 | 1 | 1.02324 |
| 1 | 0T | 2 | 1 | 0 | 2 | 10 | 2 | 1 | 0.90418 |
| 1 | TH | 2 | 1 | 1.03733 | 2 | 0T | 2 | 1 | 0 |
| 1 | H_ | 2 | 1 | 1.04732 | 2 | TH | 2 | 1 | 1.03733 |
| 1 | _S | 2 | 1 | 0.36729 | 2 | H_ | 2 | 1 | 1.04732 |
| 1 | ST | 2 | 1 | 0.47176 | 2 | _S | 2 | 1 | 0.36729 |
| 1 | T_ | 2 | 1 | 0.89096 | 2 | ST | 2 | 1 | 0.47176 |
| | | | | | 2 | T_ | 2 | 1 | 0.89096 |

Thus, the comparison of names generates a value of 0.762256. (The addresses are identical, so their similarity is equal to 1).

Referring to FIG. 4, analysis 430 of names continues if 431 the process is not yet finished with names analysis. The process advances 432 to the next biller and compares 434 the payee name with the biller name. In the example embodiment, the above n-gram process is used for comparison, and yields a numeric value between 0.0 and 1.0. This value represents the computed similarity between payee name and this particular biller's name, with lower values representing less similarity, and higher values representing greater similarity. This value is referred to, herein, as the biller's "NAME match score", and is subsequently stored 436 for later use.

Once the analysis 430 of names is complete, analysis 450 of address proceeds in a similar fashion. If 451 the process is not yet finished with address analysis, the process advances 452 to the next biller and compares 454 the payee address with the biller address. This value is referred to, herein, as the biller's "ADDRESS match score", and is subsequently stored 456 for later use. In the above-described example embodiment, name and address are analyzed individually. However, in some embodiments, name and address may be concatenated together and then compared.

After name and address analysis 430, 450 are complete, in the example embodiment, the process then aggregates 460 the NAME match score and the ADDRESS match score to produce a "COMBINED match score". From these combined match scores, the process identifies a list of the top ten nearest matches (i.e., the ten billers with highest combined match scores). This identification may be the identification 320 (shown in FIG. 3) of biller candidates shown in FIG. 3. The process provides the individual NAME and ADDRESS match scores, as well as the COMBINED match scores, and the ZIP code matching information, back to PayMax database 220 (shown in FIG. 2), and updates status of the transaction record to initiate further processing based on account number, as described above in reference to FIGS. 2 and 3, and described in greater detail below in reference to FIG. 5.

In the example embodiment described above, each transaction was compared and analyzed against each and every biller in biller information database 219. However, it should be understood that techniques to restrict a subset of billers from analysis (i.e., compare payee information only to some of the billers in biller information database 219) may provide performance improvements. More particularly, a main use of this string similarity measure is in approximately matching DBA ("doing business as") names and addresses. Logically, this is a nearest-neighbor problem. This may require the need to compute the similarity between every input name and address string to every master name and address string. That is, it may be necessary to process the Cartesian product of the input and master files. Given that biller information database may be large, there may be a significant need to greatly reduce the computation needed for approximate matching based on string similarity. It may be beneficial to know, before matching, which pairs of records are extremely unlikely to match and then skip processing those pairs.

It should be noted that the strings are represented as vectors in a vector space. Thus, the strings can be visualized as points in space—many of them. Such points are not evenly spread out in space. They are based on, for example, US DBA names and street addresses. There are patterns, unlike if the strings were composed of randomly chosen characters. The picture now may appear as points in space clumped up, for example, like stars in galaxies. There is a statistical technique called Principal Components Analysis (PCA) that finds these clumps and this was done on both the name and address spaces for US merchants. The following are what are called reference strings. They may be visualized as points selected to be near the center of the 10 biggest galaxies of strings.

TABLE 14

Example Reference Strings

| reference_string | term_type |
|---|---|
| KING RACING INC | 0 |
| BOCHTER SERVICES | 0 |
| THE CTE ON THE RIV | 0 |
| S S EXPRESS-AUBQ39 | 0 |
| MDWST STAR SATELL | 0 |
| GALENA CNTRY CORN | 0 |
| ISLE TAN | 0 |
| WAL MART PHARM | 0 |
| WIRELESS RESRC | 0 |
| SONOMA MSSN INN GOL | 0 |
| 1030 N 400 E | 1 |
| 4 S MAIN | 1 |
| 411 AVE A | 1 |
| 508 E PRINE LAKE RD | 1 |
| 60 N ROAD | 1 |
| 601 S BRAND BLVD | 1 |
| 860 S STATE ST | 1 |
| 947 N BRINTON PL | 1 |
| 965 REED RD | 1 |
| HWY 61 HWY 8 | 1 |

This will allow indexing of the data with a 10-bit binary key. For each string, initialize its key to 0000000000. Now compute the similarity between the string and each of the 10 name or address reference strings, in order. If similarity between the $i^{th}$ reference string and the the string under consideration is at least 0.1, flip the $i^{th}$ bit to 1. Because of how the reference strings were chosen, nearby strings almost always share the same reference key value. This facilitates speed of calculation because we now know which pairs of records are not worth spending a similarity calculation on—the pairs that don't have the same reference key value. There are other concessions of a similar nature in the actual matching SQL. The pairs to be examined must have matching state and city name in order to speed the process up. For example:

TABLE 15

Example 10-bit Binary Keys

| NAME | STREET ADDRESS | NAME KEY | ADDR KEY |
|---|---|---|---|
| LINCOLN PET CLINIC | 870 EAST AVE | 1000000001 | 1010000000 |
| NEGAUNEE VETERINARY CL | 30 E US 41 | 0000010000 | 1010000000 |
| ANIMAL MEDICAL CLINIC | 600 W LINCOLN ST | 0000000100 | 1000111000 |
| POWHATAN ANIMAL HOSPIT | 2540 ANDERSON HIGHWAY | 0000001100 | 1000010001 |
| CANTERBURY ANIMAL HOSP | 26135 LORAIN ROAD | 0000010100 | 0101100011 |
| ANIMAL GENERAL HOSPITA | 20005 PINEVILLE RD | 0000001100 | 1001000000 |
| BROADWAY ANIMAL HOSPIT | 3700 BROADWAY | 0000100100 | 0000010100 |
| LAUREL | 876 STOYSTOWN | 0000000000 | 0000000100 |

TABLE 15-continued

Example 10-bit Binary Keys

| NAME | STREET ADDRESS | NAME KEY | ADDR KEY |
|---|---|---|---|
| HIGHLANDS ANIMA | ROAD | | |
| YORBA LAKE PET CLINIC | 18561 YORBA LINDA BLVD | 0000010000 | 0000010000 |
| CENTRAL ANIMAL HOSPITA | 1865 CENTRAL AVE | 0000011100 | 0010001010 |

The above-described example embodiment relies on both language and address structure for the United States. Other embodiments are possible within the scope of this disclosure. Appropriate adjustments based on language differences and address structure of other nationalities postal address systems may need to be made, and are also contemplated within the scope of this disclosure.

Further, transactions and billers may be limited to comparison on state, or on state and ZIP code, or on state and a set of ZIP codes. In the example embodiment, transactions are compared only to billers in the same state (i.e., the transaction's state is presumed correct, and only billers in that state are compared against the transaction). Transactions may also only be compared to ZIP codes matching or physically near the transaction's given ZIP code.

Additionally, in the example embodiments described herein, n-grams are described as if they are computed at the time of comparison with transaction fields. However, presuming the biller information in biller information database 219 is relatively static, n-gram data for each biller may be pre-computed and stored for use during transaction comparison.

Now referring to FIG. 5, after the matching engine 218 (shown in FIG. 2) produces the match scores for a transaction, core process 220 receives notification that the transaction is ready for further processing. Core process 220 analyzes account number information of the transaction, and further adjusts match scores based on account number comparison. FIG. 5 is an example embodiment of a process for analyzing and adjusting the match scores based on account numbers and account masks.

FIG. 5 is a flow diagram 500 of an example second stage of match score adjustment that may be performed by system 200 (shown in FIG. 2). The process starts 502 with a transaction, and a list of as many as ten biller candidates (from the output of matching engine 218, shown in FIG. 2). Each biller candidate is analyzed using the process shown in flow diagram 500.

In operation 504, if a candidate biller is a "private biller", then the biller is effectively excluded from consideration. More specifically, the candidate biller's match scores are updated 506 to zero. System 200, in the example embodiment, includes a field in biller information database 219 which indicates whether or not the biller is a "private biller." Some billers may elect to be private billers, and often does so if they do not want to receive electronic payments from certain originators. For example, some billers may only want to be exposed to electronic payments from certain originators, and as such may define an exclusion list in system 200. And similarly, in the example embodiment, if a candidate biller is "share restricted", i.e., only wants to accept payments from certain originators, then that biller may define an inclusion list in system 200. Thus, that biller's match scores may be updated 506 to zero. The above-described rules represent example business rules that exclude or include certain billers from consideration. However, other sets of business rules may be employed without deviating from the scope of the present disclosure.

The remaining operations in flow diagram 500 deal with account masks for the candidate billers. Some billers may use standard formats for their account numbers, which may be represented as an account mask. An account mask is a regular expression and/or any other mask used to indicate an expected string format, including, but not limited to, a number of digits, placement of alpha characters, etc. In the example embodiment, the regular expression rules include a "#" for all digits "0" to "9", a "*" for any alphabetical character, a "@" for any alpha-numeric character, and a "!" for any combination of alpha-numeric and special characters. For example, a certain biller may always use the template "##-**####", which would match an example account number such as "76-MD5432", but would not match another example account number such as "7M-6D5432" or "76M-D5432". For some billers, however, they may have no standard format for all of their account numbers, or may have too many, or too loose of a structure to compare against. To accommodate for such variety, system 200, in the example embodiment, includes an "account mask opt-out" for billers. A biller may opt out of the account number comparison with this flag. If the biller opts out of account mask checking 510, then the biller is assigned 512 a maximum score for the account matching, the match score is updated 514, and the account analysis terminates 534 for that biller.

If the biller has not opted out of account masking (i.e., some account mask will be applied), then operation 516 checks to see if the biller is configured with a standard mask. Standard masks are masks stored by system 200 that may be commonly used, i.e., used by multiple billers. For example, several billers may use a simple style, such as 7 numeric digits, i.e., "#######". If the biller is configured with a standard mask, then that standard mask is applied against the transaction's account number in operation 518. As used herein, applying a mask to a transaction's account number, generally, involves comparing the formatting of the transaction's account number to the format defined by the mask. In some embodiments, the comparison is done on a character-by-character basis. For example, a transaction account number of "45-33067" applied to a mask of "##-#####" will result in a match. As a counter-example, the same account number applied to a mask of "###-**##" will not match because the third position contains a hyphen where the mask expected a digit, the fourth position contains a digit where the mask expected a hyphen, and the fifth and sixth positions contain digits where the mask expected alphabetic characters. The result of the standard mask application is recorded for the transaction. A match result at this operation represents some positive score with regard to the account match, and will be computed into the account portion of the match score.

After applying the standard mask in operation 518, if a match is found 520 between the transaction and the standard mask, then a second tier of match checking is performed in operation 522. Some billers, such as credit card companies, may have an additional comparison that can further authenticate the validity of an account number. The check digit routine may be any algorithm used to verify the authenticity, internal consistency, redundancy, and/or integrity of the payee consumer account number. The check digit routine may be any known or suitable check digit routine commonly used for error detection. For example, some credit card providers use the MOD 10, "Luhn", algorithm as a checksum on the digits in a credit card number. If the biller is configured in system 200 as having a mask level check digits routine, then operation 524 applies the mask level check digit routine configured for that biller against the transaction account number. A match result at this operation represents further positive score with regard to the account match, and will be computed into the account portion of the match score. If this second tier mask routine is passed 526, then the account score is updated 514 to reflect the various successes, and the process is complete 534 for this biller.

In addition, some billers may use standard check digit routines, and/or may also use custom check digit routines. In operation 528, if the biller has a biller level routine defined, then the biller level check digit routine is applied 530, and if the biller level routine is passed 532, then this represents additional positive match score.

Referring back to operation 516 and operation 520, if either the biller does not use a standard mask, or if the standard mask application does not match, then system 200 may include some exceptions to be enabled 534 and processed in this operation. Some billers may have very loosely formatted account numbers, and such a very loosely defined account mask. This type of mask falls under an exception type mask. As a matter of background, a biller may consider any check payment generated through an on-line banking service as an exception item as the payment does not include remittance advice, coupon or payment stub. These on-line payments typically do not flow through the biller's traditional lockbox remittance processing system and require manual intervention to post correctly. Therefore, these on-line payments can be considered an exception item or an exception payment. If the biller has been enabled for exception payments and has exception masks registered 536, then the exception mask will be applied 538 to the transaction account number. If the account number matches 540 this exception mask, then the biller may also analyze a second-tier check digits mask as described above in operation 522. Otherwise, account match scores are updated 514 based on the failure of the exception mask.

In the systems and methods described herein, "match scores" are numerical representations, generally, of how close a biller's information is to the transaction information provided. Several different match scores and types of match scores are described herein. One of the final outputs of system 200 is a single match score that can be used to gauge the level of confidence that the provided biller is the intended target of the transaction. However, in these example embodiments, that single match score, herein described as the "aggregate match score", is a combination of five components.

In the example embodiment, the aggregate match score is made up of comparisons between (1) name, (2) address, (3) state, (4) ZIP code, and (5) account number. Each represents one fifth, or 20 percent, of the aggregate match score. It should be understood, however, that the weightings of each of the five parts may be adjusted relative to the others without deviation from the present disclosure. These five parts of the aggregate match score are, themselves, also referred to as match scores, such as "NAME match score", "ADDRESS match score", "STATE match score", "ZIP CODE match score", and "ACCOUNT match score" (capitals sometimes used, and used merely for visual distinction). The 5 match scores are also referred to herein, collectively, as the "component match scores".

Further, in the example embodiment, each of the component match scores is computed separately. Each component match score is finally fixed between a value of 0 and 25. Thus, a maximum aggregate match score for a biller is 125 (i.e., 25*5). Some component match scores, such as ZIP code and state, are discrete values assigned from a table based on exact matching. In some embodiments, a state exact match results in 25 points for the state component match score, and a 0 otherwise. In other embodiments, a 9-digit ZIP code match results in 25 points for the ZIP code component, 20 points for only a 5-digit match, and 0 points otherwise.

The name and address match score calculations are described along with FIG. 4, and represent inexact matching. In the example embodiment, matching engine 218 produces individual match scores between 0.0 and 1.0. To map this to the 0 to 25 point range of the name and address component match scores, the individual match scores are multiplied by 25. In some embodiments, this point range is configurable. Further, in some embodiments, this point range is configurable uniquely for each aspect of scoring. For example, in one embodiment, zip code may have a maximum value of 20, state may have a maximum value of 10, address may have a maximum value of 40, and name may have a maximum value of 30. As such, different aspects may be relatively weighed.

The account number match score component logic is described along with FIG. 5. In the example embodiment, a match on standard mask only generates a score of 20, a match on mask and check digit generates a score of 25 for both the mask level and the biller level, an exception mask match generates a score of 15, and a match on exception mask and check digit generates a score of 15. It should be understood, however, that other scoring valuations are possible within the scope of this disclosure.

In some embodiments, scoring values may be weighed against each other using a table of weights, and read dynamically during processing. Such an approach facilitates ease of change. Further, the weightings provided herein are example weights, and may be adjusted without deviating from the scope of the present disclosure. Also, it should be appreciated that pre-determined scores may be given in any or all of the steps herein. Additionally, a biller may not have a check digit routine, an account number mask, and/or an exception mask, in which case the biller may be processed as if each of the foregoing three tests was successful.

Figure 6:
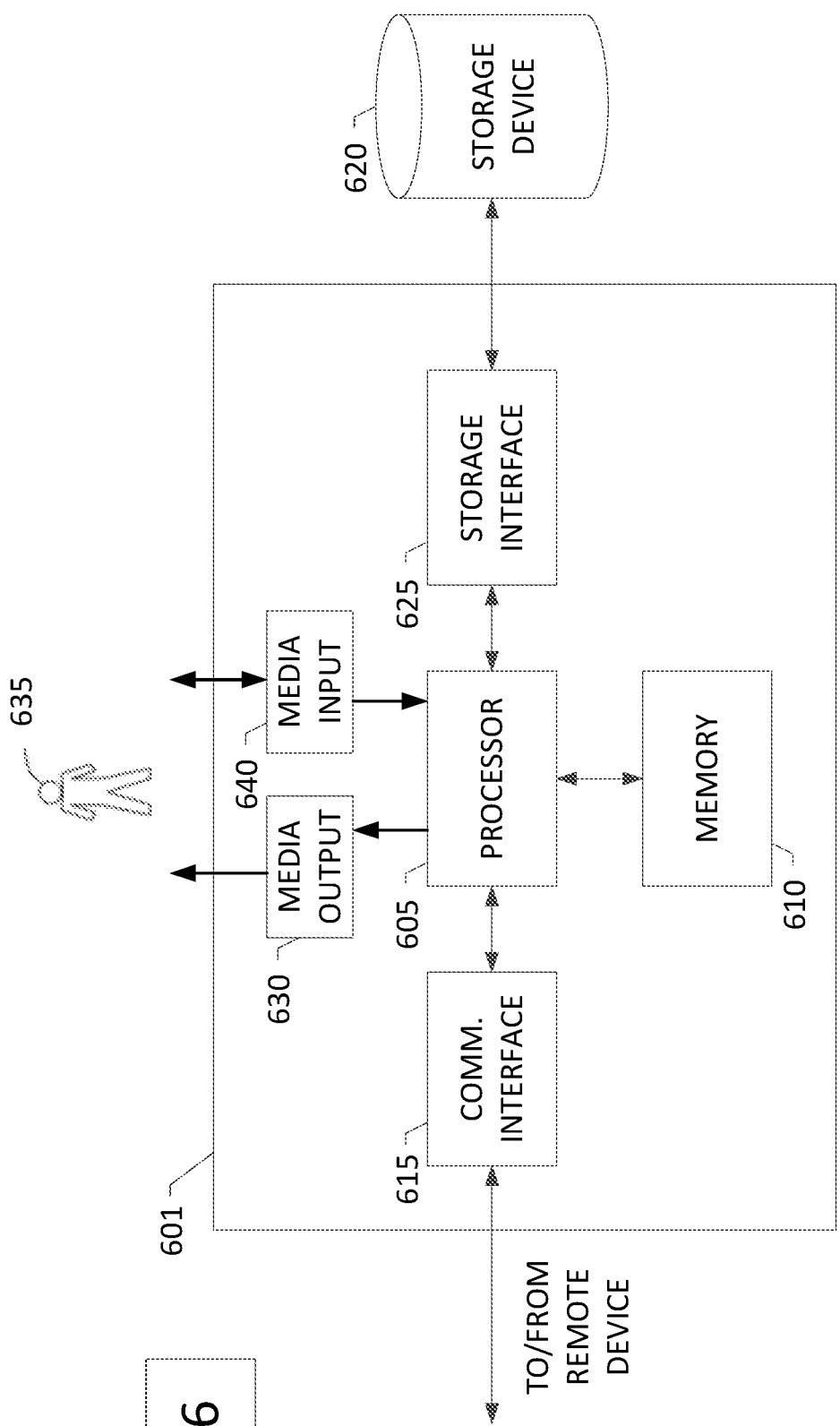

FIG. 6 illustrates an example configuration of a server system 601 that may be used with system 200 (shown in FIG. 2). Server system 601 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on the server system 601, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc).

Processor 605 is operatively coupled to a communication interface 615 such that server system 601 is capable of communicating with a remote device such as a user system or another server system 601. Communication interface 615 may include, for example, a wired or wireless network adapter or a wireless data transceiver for use with a mobile phone network, Global System for Mobile communications (GSM), 3G, or other mobile data network or Worldwide Interoperability for Microwave Access (WIMAX). For example, communication interface 615 may communicatively couple with originator 110 (shown in FIG. 1) via the Internet, or any other network.

Processor 605 may also be operatively coupled to a storage device 620. Storage device 620 is any computer-operated hardware suitable for storing and/or retrieving data. In some embodiments, storage device 620 is integrated in server system 601. For example, server system 601 may include one or more hard disk drives as storage device 620. In other embodiments, storage device 620 is external to server system 601 and may be accessed by a plurality of server systems 601. For example, storage device 620 may include multiple storage units such as hard disks or solid state disks in a redundant array of inexpensive disks (RAID) configuration. Storage device 620 may include a storage area network (SAN) and/or a network attached storage (NAS) system.

In some embodiments, processor 605 is operatively coupled to storage device 620 via a storage interface 625. Storage interface 625 is any component capable of providing processor 605 with access to storage device 620. Storage interface 625 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 620.

Server system 601 may also include at least one media output component 630 for presenting information to a user 635. Media output component 630 is any component capable of conveying information to user 635. In some embodiments, media output component 630 includes an output adapter such as a video adapter and/or an audio adapter. An output adapter is operatively coupled to processor 605 and operatively couplable to an output device such as a display device, a liquid crystal display (LCD), organic light emitting diode (OLED) display, or "electronic ink" display, or an audio output device, a speaker or headphones.

In some embodiments, server system 601 includes an input device 640 for receiving input from user 635. Input device 640 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 630 and input device 640.

Memory area 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Stored in memory area 610 are, for example, computer readable instructions for providing a user interface to user 635 via media output component 630 and, optionally, receiving and processing input from input device 640. A user interface may include, among other possibilities, a web browser and client application. Web browsers enable users, such as user 635, to display and interact with media and other information typically embedded on a web page or a website from server system 601. A client application allows user 635 to interact with a server application from server system 601.

Figure 7:
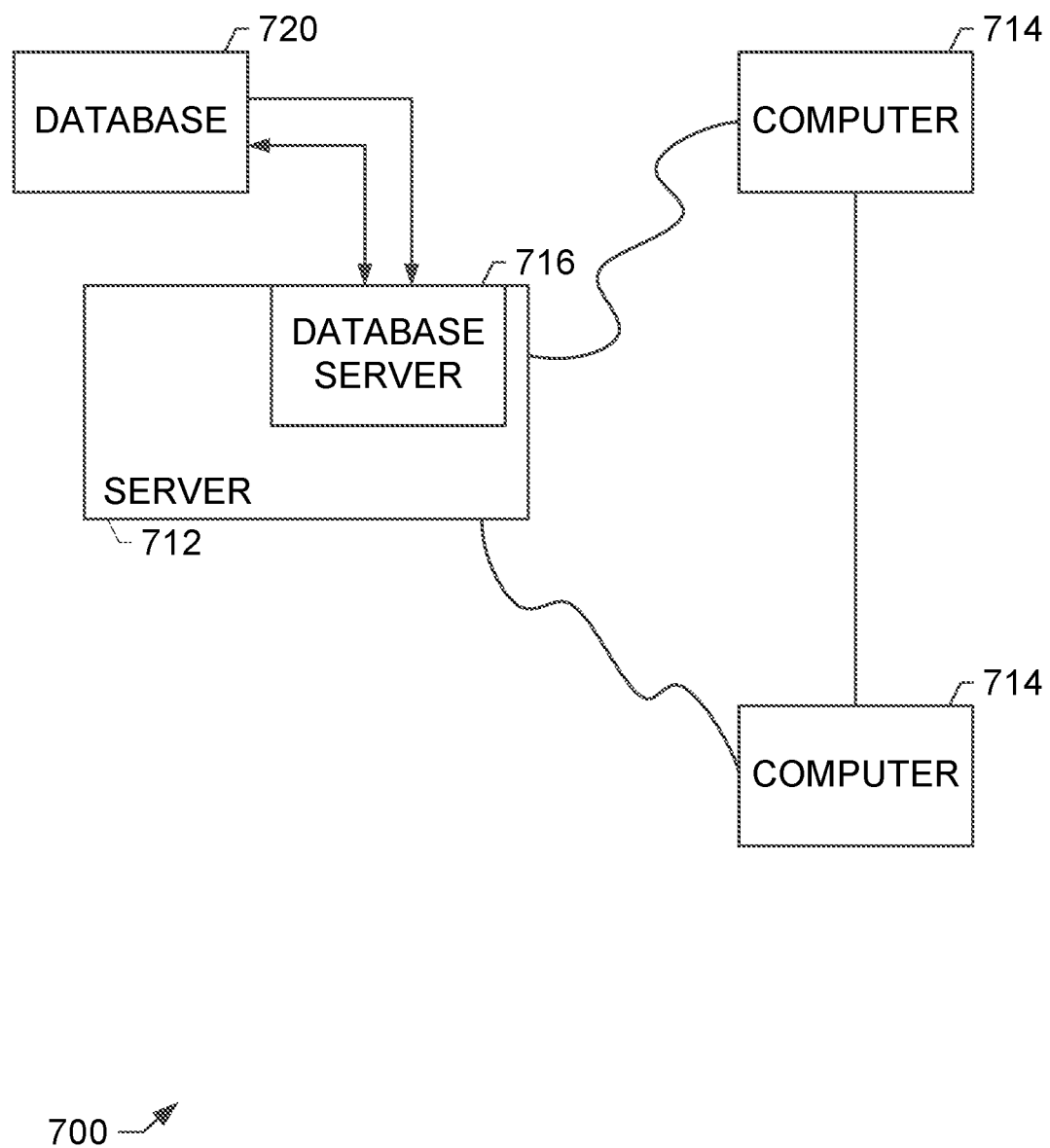

FIG. 7 is a simplified block diagram of an example system 700 for use with system 200 shown in FIG. 2. In one embodiment, system 700 is similar to payee verification processor 150 (shown in FIG. 1). More specifically, in the example embodiment, system 700 includes a server system 712, and a plurality of client sub-systems, also referred to as client systems 714, connected to server system 712. System 700 is sometimes referred to as the RPPS® (Remote Payment and Presentment Service) system or the payment system. (RPPS is a registered trademark of MasterCard International Incorporated.) In one embodiment, client systems 714 are computers including a web browser, such that server system 712 is accessible to client systems 714 using the Internet. Client systems 714 are interconnected to the Internet through many interfaces including a network, such as a local area network (LAN) or a wide area network (WAN), dial-in-connections, cable modems and special high-speed ISDN lines. Client systems 714 could be any device capable of interconnecting to the Internet including a web-based phone, personal digital assistant (PDA), or other web-based connectable equipment. A database server 716 is connected to a database 720 containing information on a variety of matters, as described below in greater detail. In one embodiment, centralized database 720 is stored on server system 712 and can be accessed by potential users at one of client systems 714 by logging onto server system 712 through one of client systems 714. In an alternative embodiment, database 720 is stored remotely from server system 712 and may be non-centralized.

As discussed within, a biller directory, e.g., biller database 219 (shown in FIG. 2), and/or other consumer related data including data utilized and processed by the billers can be stored within database 720. For example, the biller directory may include a list of billers registered to receive payments electronically, a format or structure of consumer account related information that is acceptable for each biller (also referred to herein as an account mask or billing account structure) for processing payments electronically, exception masks associated with the registered billers if required by the particular biller, a list of consumer accounts that are registered for electronic processing of payments, and other consumer related information such as names of the consumers, addresses and telephone numbers, other consumer identifiers, account numbers and payment histories. Other data may also be stored within database 720 including originator database 140 and/or exception payment batch files. In addition, similar data or other billing and consumer related data may also be stored within other databases such as a database associated with billers and/or a database associated with originators.

Figure 8:
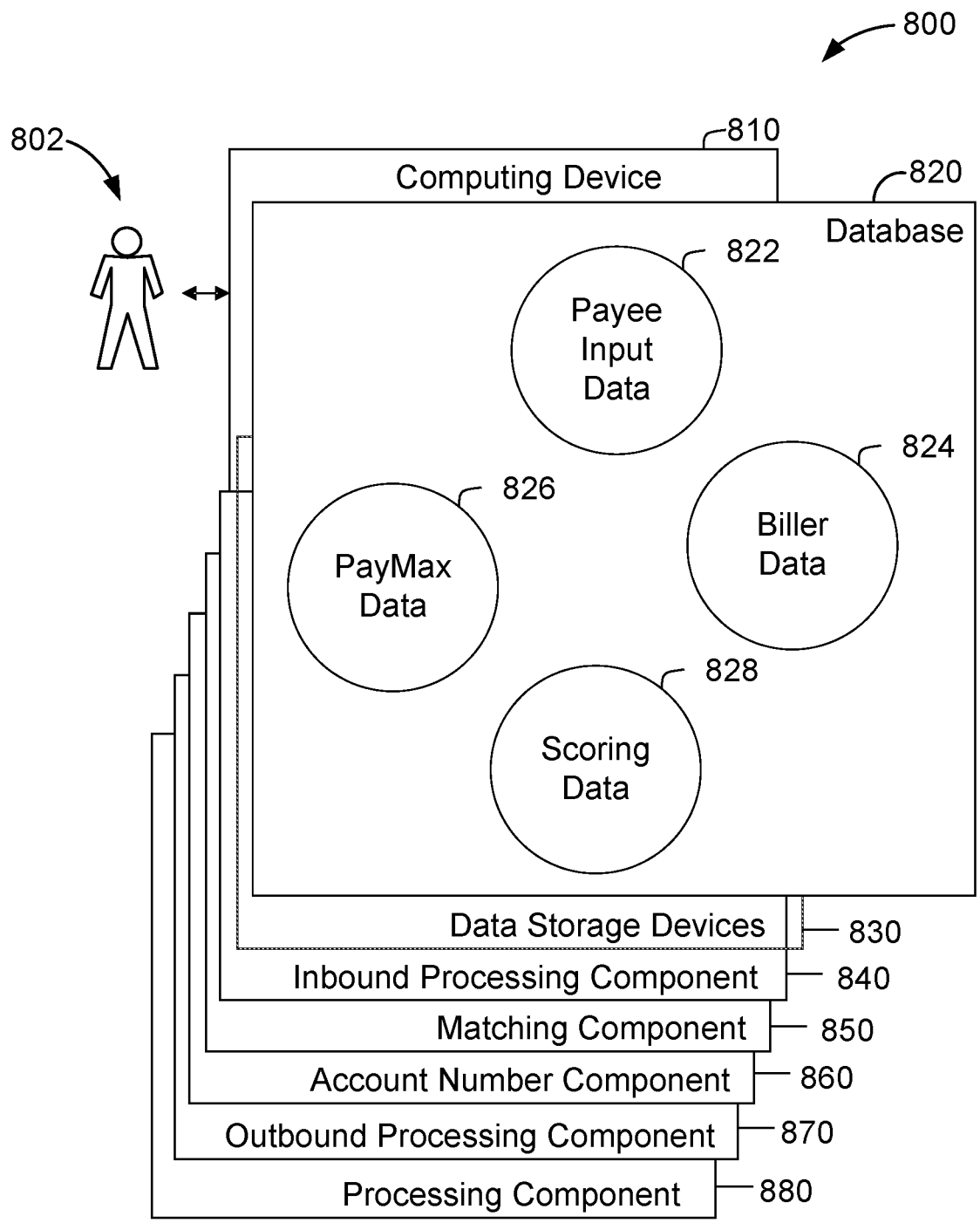

FIG. 8 shows an example configuration 800 of a database 820 within a computing device 810, along with other related computing components, that may be used during the payee verification process. Database 820 is coupled to several separate components within computing device 810, which perform specific tasks.

In the example embodiment, database 820 includes user payee input data 822, biller data 824, PayMax data 826, and scoring data 828. Payee input data 822 includes payee transaction-related information, such as, for example, a payee transaction including a payee name, address, state, and zip code. In some embodiments, payee input data 822 may include data from inbound file 204 (shown in FIG. 2). Biller data 824 includes information on the known list of billers, such as, for example, a particular biller's name, alternate names for that biller, the biller's address, state, and zip code. In some embodiments, biller data 824 may include biller info 219 (shown in FIG. 2). PayMax data 826 includes information used during the analysis of payee transaction information, and may include, for example, payee input data 822, output data from matching engine 218, and configuration settings used by system 200. Scoring data 828 includes, for example, scoring information associated with comparing payee information to biller information by matching engine 218, scoring information associated with comparing payee account number information to biller account masks, and scoring configuration data.

Computing device 810 includes the database 820, as well as data storage devices 830. Computing device 810 also includes an inbound processing component 840 for receiving and processing the inbound information from an originator 110 (shown in FIG. 1) into the database 820. Computing device 810 also includes a matching component 850 for comparing payee data 822 to biller data 824. An account number component 860 is also included for comparing payee account number information to biller account masks. Further, computing device 810 includes an outbound processing component 870 for communicating results back to originator 110. A processing component 880 assists with execution of computer-executable instructions associated with the user authentication system.

The embodiments illustrated and described herein as well as embodiments not specifically described herein but within the scope of aspects of the disclosure constitute exemplary means for the electronic processing of financial transactions, and more particularly, constitute exemplary means for the electronic processing of financial transactions having a payment included therewith in order to affect payment of a bill. For example, the server system 712 or the client system 714, or any other similar computer device, programmed with computer-executable instructions illustrated in FIG. 7 constitutes exemplary means for the electronic processing of financial transactions having an exception payment included therewith in order to affect payment of a bill.

As used herein, an originator includes any entity providing a consumer with a service to facilitate on-line bill payment. For example, an originator may include a financial institution such as a bank or a third-party entity used by a bank for processing on-line payments for consumers. An originator may also include or be referred to as a consumer service provider (CSP). A biller is typically a merchant or an entity that provides a good or service to a consumer. A biller service provider is an entity that provides a biller with a service to allow the biller to receive bill payments. In some cases, a biller can also serve as a biller service provider for themselves or other billers. Accordingly, as used herein, in at least some cases the biller and the biller service provider can be the same entity.

In an alternative embodiment, some or all of the tasks described above as being performed by the originator, the biller service provider and/or the biller are performed by payment system 700. For example, in an alternative embodiment, the originators and billers opting to use the payment system (i.e., sending and receiving exception payments electronically) are stored within the payment system.

In at least some known electronic bill payment systems, payments are originated by a bill payment service provider, which is also known as an originator. These payments may be fulfilled either via an electronic transaction or via a paper check. The determination of whether a bill payment is fulfilled electronically or via check is based on the data the consumer enters for the payment. If the data entered matches billing data (account masks, remittance address, check digit routine, etc.) provided by a biller or payor, and are reflected on a biller directory provided to the bill payment service provider, then the payment can be fulfilled electronically by the bill payment service provider (originator). If the data entered by the consumer does not match the billing data provided by the biller and stored on the biller directory, an originator will have to create a paper check containing the consumer entered data for the payment method. The paper check is then provided to the biller or the biller's service provider.

It should be noted that originators prefer to fulfill transactions electronically for several reasons. First, it is a lower cost fulfillment method. Typically, an electronic fulfillment method costs the originator $0.10 or less, while a paper check will cost them $0.40-$0.50 per item. Secondly, the payment is posted more quickly if it is fulfilled electronically, which leads to greater customer satisfaction. The originator is typically any entity that provides a consumer with a service to facilitate on-line bill payment. For example, an originator may include a financial institution such as a bank or a third-party entity used by a bank for processing on-line payments for consumers.

As more and more consumers pay their bills on-line using bill payment services, billers are receiving more and more paper check items. The systems and processes described herein enable billers to electronically receive payment, even if the consumer entered data is not an exact match to the criteria the biller provides for valid electronic payments. In other words, the systems and process described herein enable billers to electronically receive payment, for example, in those cases where the consumer entered address data does not match the biller's address.

In the example embodiment, a RPPS biller directory, e.g., biller database 219, contains a list of electronic billers and their accompanying payment data. If the payment data provided by the originator meets the data requirements outlined in the biller directory, RPPS system 700 will process, route and settle the payment electronically. The biller directory may be stored on payment system 700. For example, the biller directory may be stored on database 720. In one embodiment, the biller directory is downloaded from payment system 700 to a computer system associated with the originator. In another embodiment, the biller directory is stored at payment system 700 and the originator system retrieves information from the biller directory as needed.

As used herein, an exception mask is a minimum criterion or criteria that a biller requires in order to agree to accept an exception payment electronically from a consumer. For example, an account number for a biller may include ten digits with the first two digits being alpha and the last eight digits being numeric, and therefore, the biller may require the exception mask to be that the first two alpha digits are correctly entered and at least four of the last eight numeric digits are correctly entered before the biller will accept payment electronically as an exception payment. In the example embodiment, a biller is not required to establish exception masks. In other words, a biller is not required to have a minimum criterion or criteria (i.e., a minimum amount of correctly inputted consumer information) before accepting an exception payment electronically, but rather a biller not requiring an exception mask will accept an exception payment electronically without conditions or requirements on the amount or type of information correctly inputted by the consumer.

In contrast, an account mask is a format or structure of consumer account related information that is acceptable for a biller for processing payments electronically. For example, an account mask or structure for a biller may include ten digits with the first two digits being alpha and the last eight digits being numeric. In this case, when a consumer enters information to make an electronic payment and enters their consumer account number, the system compares the consumer entered account number to the account mask for the biller to determine whether the structure of the entered account number matches the account mask. If so, the payment is processed electronically. If there is not a match, then the payment may be designated as an exception payment for further processing including determining whether an exception mask, if applicable, is satisfied.

In one embodiment, a computer program is provided, and the program is embodied on a computer readable medium and utilizes a Structured Query Language (SQL) with a client user interface front-end for administration and a web interface for standard user input and reports. In an example embodiment, the system is web enabled and is run on a business-entity intranet. In yet another embodiment, the system is fully accessed by individuals having an authorized access outside the firewall of the business-entity through the Internet. In a further example embodiment, the system is being run in a Windows® environment (Windows is a registered trademark of Microsoft Corporation, Redmond, Washington). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is receiving a payee input file, determining whether each payee in the payee input file matches a biller in a biller database, and outputting an output file that indicates whether each payee was matched to a biller. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of methods and systems of verifying payees of electronic payments provide a cost-effective and reliable means for determining whether a payee is capable of receiving electronic payments. As a result, the methods and systems described herein facilitate verifying payees of electronic payments by identifying payees capable of receiving electronic payments.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system for improving error tolerance in processing a plurality of input files, the computer system comprising:
   at least one database; and
   at least one processor communicatively coupled to the at least one database, the at least one processor programmed to:
      receive the input files and distribute portions of each received input file to one of a plurality of node-cluster nodes;
      perform an inbound process in parallel at each node-cluster node by:
         receiving respective portions of the routed input files;
         extracting input data records from the input files, each of the input data records comprising data for a plurality of input fields; and
         storing the input data records in the at least one database;
      store a plurality of destination records in the at least one database, each of the destination records including data for a plurality of destination fields, wherein the plurality of destination fields correspond to the plurality of input fields;
      for each stored input data record, execute a matching engine to:
         compare the data in the plurality of input fields to the data in the destination fields of each of the destination records;
         generate a match score for each of the destination records based on the comparison of the data;
         generate a list of candidate destination records by ranking the match score for each destination record; and
         update the input data record stored in the at least one database to include the list of candidate destination records and the corresponding match scores; and
      for each updated stored input data record, perform a core process in parallel at each node-cluster node by:

comparing, for each of the candidate destination records, a format of the data in at least one of the input fields to a mask associated with the corresponding destination field;
adjusting the match score of the candidate destination record based on the comparison to the mask;
generating an output record including the data from the destination fields of the candidate destination record having the highest adjusted match score; and
transmitting the output record to a gateway processor.

2. The computer system in accordance with claim 1, wherein the at least one processor is further programmed to:
detect the storage of the input data records in the at least one database; and
in response to detecting the storage of each input data record, execute a call to the matching engine for the detected stored input data record.

3. The computer system in accordance with claim 1, wherein the at least one processor is further configured to:
after updating the input data records stored in the at least one database, update a status flag in the at least one database;
monitor the at least one database for the update to the status flag; and
perform the comparing of the format of the data in the at least one of the input fields to the mask in response to detecting the updated status flag.

4. The computer system in accordance with claim 1, wherein the inbound process is further programmed to tag each of the extracted input data records from the input file with an identical batch ID.

5. The computer system in accordance with claim 4, wherein the core process is further programmed to transmit the output record to the gateway processor in at least one output file, wherein the at least one output file batches multiple output records corresponding to multiple input records sharing the identical batch ID.

6. The computer system in accordance with claim 5, wherein:
the core process is further programmed to compare the adjusted match scores to a matching threshold; and
the at least one output file includes:
a first output file that includes output records for which the adjusted match score meets or exceeds the matching threshold; and
a second output file that includes output records for which the adjusted match score is less than the matching threshold.

7. The computer system in accordance with claim 1, wherein the at least one database is implemented in a common logical database managed by a common relational database management system.

8. A computer-based method for improving error tolerance in processing a plurality of input files, said method implemented on a computer system including at least one database and at least one processor communicatively coupled to the at least one database, the method comprising:
receiving the input files and distributing portions of each received input file to one of a plurality of node-cluster nodes;
performing an inbound process in parallel at each node-cluster node by:
receiving respective portions of the routed input files;
extracting input data records from the input files, each of the input data records comprising data for a plurality of input fields; and
storing the input data records in the at least one database;
storing a plurality of destination records in the at least one database, each of the destination records including data for a plurality of destination fields, wherein the plurality of destination fields correspond to the plurality of input fields;
for each stored input data record, executing a matching engine to:
compare the data in the plurality of input fields to the data in the destination fields of each of the destination records;
generate a match score for each of the destination records based on the comparison of the data;
generate a list of candidate destination records by ranking the match score for each destination record; and
update the input data record stored in the at least one database to include the list of candidate destination records and the corresponding match scores; and
for each updated stored input data record, performing a core process in parallel at each node-cluster node by:
comparing, for each of the candidate destination records, a format of the data in at least one of the input fields to a mask associated with the corresponding destination field;
adjusting the match score of the candidate destination record based on the comparison to the mask;
generating an output record including the data from the destination fields of the candidate destination record having the highest adjusted match score; and
transmitting the output record to a gateway processor.

9. The method in accordance with claim 8, further comprising:
detecting the storage of the input data records in the at least one database; and
in response to the detecting, executing a call to the matching engine for the detected stored input data record.

10. The method in accordance with claim 8, further comprising:
after updating the input data records stored in the at least one database, updating a status flag in the at least one database; and
monitoring, by the core process of one of the node-cluster nodes, the cluster database for the update to the status flag; and
performing, by the core process of the one of the node-cluster nodes, the comparing of the format of the data in the at least one of the input fields to the mask in response to detecting the updated status flag.

11. The method in accordance with claim 8, further comprising tagging, by the inbound process of one of the node-cluster nodes, each of the extracted input data records from the input file with an identical batch ID.

12. The method in accordance with claim 11, further comprising transmitting, by the core process of the one of the node-cluster nodes, the output record to the gateway processor in at least one output file, wherein the at least one output file batches multiple output records corresponding to multiple input records sharing the identical batch ID.

13. The method in accordance with claim 12, further comprising:

comparing, by the core process of the one of the node-cluster nodes, the adjusted match scores to a matching threshold; and wherein transmitting, by the core process of the one of the node-cluster nodes, the output record in the at least one output file comprises:

transmitting a first output file that includes output records for which the adjusted match score meets or exceeds the matching threshold; and transmitting a second output file that includes output records for which the adjusted match score is less than the matching threshold.

14. The method in accordance with claim 8, further comprising implementing the at least one database in a common logical database managed by a common relational database management system.

15. At least one non-transitory computer-readable storage media having computer-executable instructions embodied therein, wherein when executed by at least one processor, the computer-executable instructions cause the at least one processor to:

receive input files and distribute portions of each received input file to one of a plurality of node-cluster nodes;

perform an inbound process in parallel at each node-cluster node by:
  receiving respective portions of the routed input files;
  extracting input data records from the input files, each of the input data records comprising data for a plurality of input fields; and
  storing the input data records in at least one database;

store a plurality of destination records in the at least one database, each of the destination records including data for a plurality of destination fields, wherein the plurality of destination fields correspond to the plurality of input fields;

for each stored input data record, execute a matching engine to:
  compare the data in the plurality of input fields to the data in the destination fields of each of the destination records;
  generate a match score for each of the destination records based on the comparison of the data;
  generate a list of candidate destination records by ranking the match score for each destination record; and
  update the input data record stored in the at least one database to include the list of candidate destination records and the corresponding match scores; and for each updated stored input data record, perform a core process in parallel at each node-cluster node by:
  comparing, for each of the candidate destination records, a format of the data in at least one of the input fields to a mask associated with the corresponding destination field;
  adjusting the match score of the candidate destination record based on the comparison to the mask;
  generating an output record including the data from the destination fields of the candidate destination record having the highest adjusted match score; and
  transmitting the output record to a gateway processor.

16. The at least one non-transitory computer-readable storage media of claim 15, wherein the computer-executable instructions further cause the at least one processor to:

detect the storage of the input data records in the at least one database; and in response to detecting the storage of each input data record, execute a call to the matching engine for the detected stored input data record.

17. The at least one non-transitory computer-readable storage media of claim 15, wherein the computer-executable instructions further cause the at least one processor to:

after updating the input data records stored in the at least one database, update a status flag in the at least one database;

monitor the at least one database for the update to the status flag; and perform the comparing of the format of the data in the at least one of the input fields to the mask in response to detecting the updated status flag.

18. The at least one non-transitory computer-readable storage media of claim 15, wherein the computer-executable instructions further cause the at least one processor to tag each of the extracted input data records from the input file with an identical batch ID.

19. The at least one non-transitory computer-readable storage media of claim 18, wherein the computer-executable instructions further cause the at least one processor to transmit the output record to the gateway processor in at least one output file, wherein the at least one output file batches multiple output records corresponding to multiple input records sharing the identical batch ID.

20. The at least one non-transitory computer-readable storage media of claim 19, wherein the computer-executable instructions further cause the at least one processor to compare the adjusted match scores to a matching threshold, and wherein the at least one output file includes i) a first output file that includes output records for which the adjusted match score meets or exceeds the matching threshold and ii) a second output file that includes output records for which the adjusted match score is less than the matching threshold.

* * * * *